United States Patent
Tie et al.

(10) Patent No.: US 9,661,580 B2
(45) Date of Patent: May 23, 2017

(54) METHOD AND APPARATUS FOR POWER CONTROL AND PARAMETER CONFIGURATION

(71) Applicant: Huawei Technologies Co., LTD, Shenzhen (CN)

(72) Inventors: Xiaolei Tie, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 457 days.

(21) Appl. No.: 14/157,200

(22) Filed: Jan. 16, 2014

(65) Prior Publication Data

US 2014/0204861 A1    Jul. 24, 2014

(30) Foreign Application Priority Data

Jan. 18, 2013   (CN) .......................... 2013 1 0019525

(51) Int. Cl.
*H04W 52/24* (2009.01)
*H04W 52/04* (2009.01)

(52) U.S. Cl.
CPC ......... *H04W 52/24* (2013.01); *H04W 52/241* (2013.01); *H04W 52/04* (2013.01)

(58) Field of Classification Search
CPC . H04W 52/24; H04W 52/241; H04W 52/243; H04W 52/244; H04W 52/08; H04W 24/02; H04W 24/10; H04W 52/04; H04W 52/00; H04W 52/18

USPC .......................................................... 370/329
See application file for complete search history.

(56) References Cited

U.S. PATENT DOCUMENTS

| | | | |
|---|---|---|---|
| 2011/0177838 A1* | 7/2011 | Olszewski ............ | H04W 52/42 455/522 |
| 2012/0009969 A1 | 1/2012 | Park et al. | |
| 2013/0107828 A1* | 5/2013 | Dinan ................. | H04W 52/346 370/329 |
| 2013/0194940 A1* | 8/2013 | Li ........................ | H04J 11/0023 370/252 |
| 2015/0110024 A1* | 4/2015 | Manssour ......... | H04W 72/1273 370/329 |

FOREIGN PATENT DOCUMENTS

| | | |
|---|---|---|
| CN | 102740436 A | 10/2012 |
| EP | 2675223 A1 | 12/2013 |
| KR | 20120133650 A | 12/2012 |

* cited by examiner

*Primary Examiner* — Michael Thier
*Assistant Examiner* — Rownak Islam
(74) *Attorney, Agent, or Firm* — Slater Matsil, LLP

(57) ABSTRACT

Embodiments of the present invention provide a method and an apparatus for power control. In one embodiment, a current serving node is a first base station. A first switching time at which the second base station switches from transmission of a non-ABS subframe to transmission of an ABS subframe is determined according to an ABS pattern parameter of a second base station. At the first switching time, a target SINR value is adjusted before current switching to obtain a target SINR value of the first switching time.

16 Claims, 8 Drawing Sheets

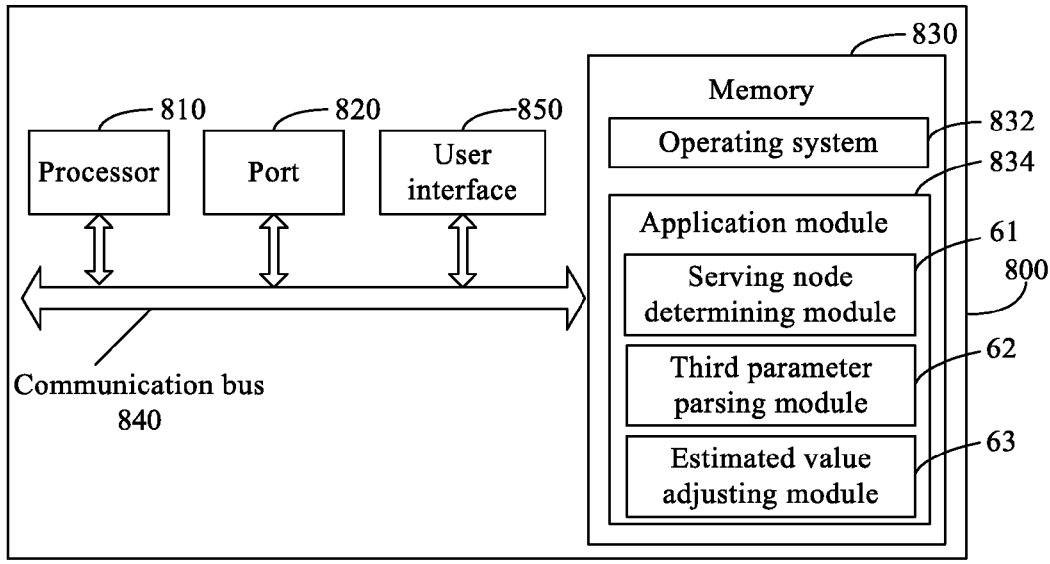

FIG. 8

Determine a power offset parameter, where the power offset parameter is a ratio of a reference value of a difference value between transmit power of an ABS subframe and a non-ABS subframe that are transmitted by a second base station to transmit power of a CPICH, or is a reference value of a ratio of transmit power of an HS-PDSCH of a second base station to transmit power of a CPICH ⟶ 901

Configure the power offset parameter for a UE within coverage of the second base station or for a UE that uses a first base station as a current serving node, where the second base station has co-channel interference in the first base station ⟶ 902

FIG. 9

METHOD AND APPARATUS FOR POWER CONTROL AND PARAMETER CONFIGURATION

CROSS-REFERENCE TO RELATED APPLICATIONS

This application claims priority to Chinese Patent Application No. 201310019525.5, filed on Jan. 18, 2013, which is hereby incorporated by reference in its entirety.

TECHNICAL FIELD

Embodiments of the present invention relate to communication technologies, and in particular, to a method and an apparatus for power control and parameter configuration.

BACKGROUND

A Heterogeneous Network (Hetnet) enhances frequency efficiency of a local space by introducing hierarchical pico cells, where a pico cell base station is also referred to as a micro base station or a low power node (LPN). An almost blank subframe (ABS) technology is used as an important technology in the Hetnet. Its main conception is shown in FIG. 1. An ABS pattern is defined for a macro base station, where the pattern is made up of an ABS subframe (also referred to as a weak frame or a silence frame) and a non-ABS subframe (also referred to as a strong frame or a non-silence frame). In an ABS subframe, a macro base station stops scheduling downlink data packet services such as a High Speed Downlink Packet Access (HSDPA) service for a macro user equipment (UE), and the macro base station has little interference in the micro base station, and in this case, the micro base station may schedule a UE at an edge of an LPN (E-LUE). However, in a non-ABS subframe, the macro base station may normally schedule a macro UE (MUE) in an HSDPA downlink channel, namely, a High Speed Physical Downlink Shared Channel (HS-PDSCH), and in this case, the micro base station may schedule a UE in the center of the LPN (C-LUE). For an E-LUE, interference includes two parts: one part of interference from a local cell of the LPN, and the other part of interference from an MUE in a neighboring cell, where the second part of interference is relatively high and has a greater impact on the E-LUE. Therefore, alternation of weak and strong ABS frames of the macro base station causes great fluctuation in interference received by the E-LUE.

In a universal mobile telecommunications system (UMTS), in addition to a high speed packet access channel, an R99 channel for carrying circuit switched (CS) voice and important radio resource control (RRC) signaling also exists. A transmission time interval (TTI) of the R99 channel is mainly 10 milliseconds (ms) or 20 ms, but a TTI of an HS-PDSCH is only 2 ms. Therefore, for a service in the R99 channel, a weak ABS frame conversely causes a great change of interference received by a UE at one TTI of the R99 channel. Meanwhile, quality of a channel in the weak frame may actually become poor, but this channel fading is not enough to counteract an increase in a signal to interference plus noise ratio (SINR) resulting from loss of interference from a neighboring cell of the macro base station. Consequently, fast channel fading cannot be tracked in the weak frame during power control of an LPN UE, an SINR of the LPN UE after the LPN UE returns to a strong frame becomes low, and more time slots need to be occupied to reach a target SINR value. This causes performance loss of the R99 channel, and it is disadvantageous for transmitting a service through the R99 channel. The more weak frames an ABS pattern includes, the more serious the problem of failure of inner loop power control in the weak frames is. When an ABS pattern includes two weak frames, the interference change has an apparent impact on the service in the R99 channel.

SUMMARY

Embodiments of the present invention provide a method and an apparatus for power control and parameter configuration, so as to solve, to some extent, a problem that an ABS technology in an existing UMTS system causes an impact on a service carried by an R99 channel.

In a first aspect, an embodiment of the present invention provides a method for power control, including:

determining that a current serving node is a first base station;

determining, according to ABS pattern parameters of a second base station, first switching time at which the second base station switches from transmission of a non-ABS subframe to transmission of an ABS subframe, where the second base station has co-channel interference in the first base station; and adjusting, at the first switching time, a target signal to SINR value before current switching to obtain a target SINR value of the first switching time, so that the target SINR value of the first switching time is used as an initial target SINR value for performing inner loop power control for the first base station in a transmission time segment of the ABS subframe, where the target SINR value of the first switching time is greater than the target SINR value before current switching.

In a second aspect, an embodiment of the present invention provides a method for power control, including:

determining that a current serving node is a first base station;

determining, according to ABS pattern parameters of a second base station, a first transmission time segment in which the second base station transmits an ABS subframe, where the second base station has co-channel interference in the first base station; and adjusting an actual estimated SINR value in the first transmission time segment to obtain an adjusted estimated SINR value, so that inner loop power control is performed for the first base station according to the adjusted estimated SINR value, where the adjusted estimated SINR value is less than the actual estimated SINR value.

In a third aspect, an embodiment of the present invention provides an apparatus for power control, including:

a serving node determining module, adapted to determine that a current serving node is a first base station;

a first parameter parsing module, adapted to determine, according to ABS pattern parameters of a second base station, first switching time at which the second base station switches from transmission of a non-ABS subframe to transmission of an ABS subframe, where the second base station has co-channel interference in the first base station; and a first target value adjusting module, adapted to adjust, at the first switching time, a target SINR value before current switching to obtain a target SINR value of the first switching time, so that the target SINR value of the first switching time is used as an initial target SINR value for performing inner loop power control for the first base station in a transmission time segment of the ABS subframe, where the target SINR value of the first switching time is greater than the target SINR value before current switching.

In a fourth aspect, an embodiment of the present invention provides an apparatus for power control, including:

a serving node determining module, adapted to determine that a current serving node is a first base station;

a third parameter parsing module, adapted to determine, according to ABS pattern parameters of a second base station, a first transmission time segment in which the second base station transmits an ABS subframe, where the second base station has co-channel interference in the first base station; and an estimated value adjusting module, adapted to adjust an actual estimated SINR value in the first transmission time segment to obtain an adjusted estimated SINR value, so that inner loop power control is performed for the first base station according to the adjusted estimated SINR value, where the adjusted estimated SINR value is less than the actual estimated SINR value.

In a fifth aspect, an embodiment of the present invention provides a method for parameter configuration, including:

determining a power offset parameter, where the power offset parameter is a ratio of a reference value of a difference value between transmit power of an ABS subframe and a non-ABS subframe that are transmitted by a second base station to transmit power of a Common Pilot Channel (CPICH), or is a reference value of a ratio of transmit power of a High Speed Physical Downlink Shared Channel HS-PDSCH of a second base station to transmit power of a CPICH; and configuring the power offset parameter for a user equipment UE within coverage of the second base station or for a UE that uses a first base station as a current serving node, where the second base station has co-channel interference in the first base station.

In a sixth aspect, an embodiment of the present invention provides a method for parameter configuration, including:

receiving a power offset parameter configured by a network side, where the power offset parameter is a ratio of a reference value of a difference value between transmit power of an almost blank pattern ABS subframe and a non-ABS subframe that are transmitted by a second base station to transmit power of a CPICH, or is a reference value of a ratio of transmit power of a High Speed Physical Downlink Shared Channel HS-PDSCH of a second base station to transmit power of a CPICH; and estimating, according to the power offset parameter when a current serving node is a first base station, a power difference between interference in an ABS subframe transmission mode and a non-ABS subframe transmission mode that are used by the second base station, where the second base station has co-channel interference in the first base station.

In a seventh aspect, an embodiment of the present invention provides an apparatus for parameter configuration, including:

a parameter determining module, adapted to determine a power offset parameter, where the power offset parameter is a ratio of a reference value of a difference value between transmit power of an almost blank pattern ABS subframe and a non-ABS subframe that are transmitted by a second base station to transmit power of a CPICH, or is a reference value of a ratio of transmit power of a High Speed Physical Downlink Shared Channel HS-PDSCH of a second base station to transmit power of a CPICH; and a configuring module, adapted to configure the power offset parameter for a user equipment UE within coverage of the second base station or for a UE that uses a first base station as a current serving node, where the second base station has co-channel interference in the first base station.

In an eighth aspect, an embodiment of the present invention provides an apparatus for parameter configuration, including:

a receiving module, adapted to receive a power offset parameter configured by a network side, where the power offset parameter is a ratio of a reference value of a difference value between transmit power of an almost blank pattern ABS subframe and a non-ABS subframe that are transmitted by a second base station to transmit power of a CPICH, or is a reference value of a ratio of transmit power of a High Speed Physical Downlink Shared Channel HS-PDSCH of a second base station to transmit power of a CPICH; and an interference estimating module, adapted to estimate, according to the power offset parameter when a current serving node is a first base station, a power difference between interference in an ABS subframe transmission mode and a non-ABS subframe transmission mode that are used by the second base station, where the second base station has co-channel interference in the first base station.

One of the multiple technical solutions has at least the following technical effects:

In the embodiments of the present invention, a target SINR value is adjusted to a larger value at first switching time at which a second base station switches from transmission of a non-ABS subframe to transmission of an ABS subframe, and the adjusted target SINR value is used as an initial target SINR value for performing inner loop power control for a first base station in a transmission time segment of the ABS subframe, or an adjusted estimated SINR value less than an actual estimated SINR value is used to perform inner loop power control for the first base station in a first transmission time segment in which the second base station transmits the ABS subframe. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 8 is a schematic structural diagram of a UE according to a sixth embodiment of the present invention;

FIG. 9 is a schematic flowchart of a method for parameter configuration according to a seventh embodiment of the present invention;

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
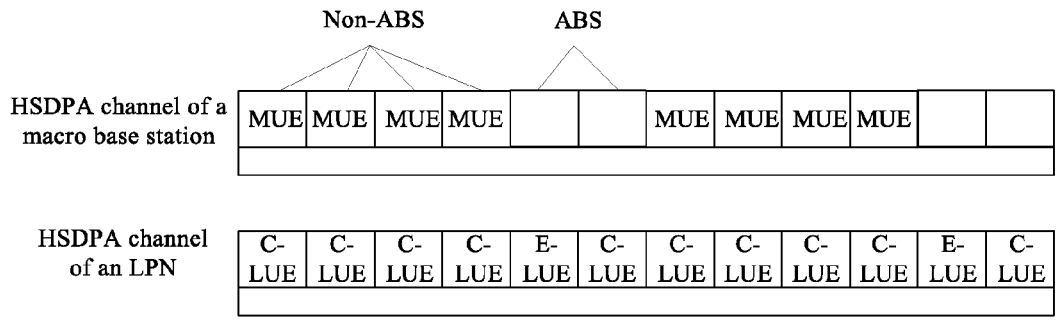
FIG. 1 is a schematic diagram of an ABS technology in a Hetnet.
Figure 2:
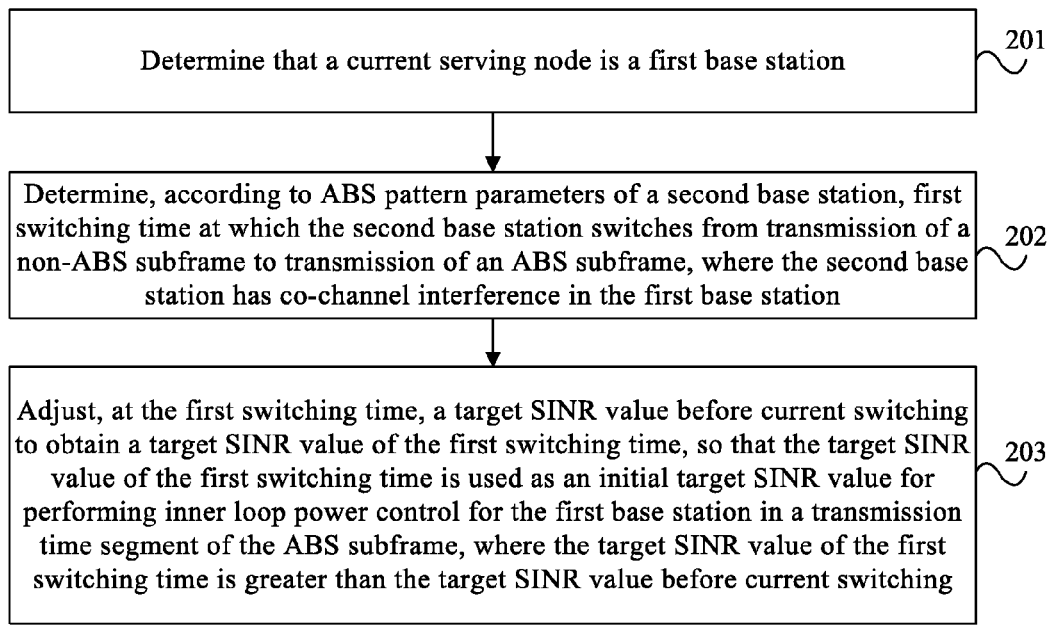
FIG. 2 is a schematic flowchart of a method for power control according to a first embodiment of the present invention.

FIG. 2 is a schematic flowchart of a method for power control according to a first embodiment of the present invention. As shown in FIG. 2, the method includes the following:

201. Determine that a current serving node is a first base station.

For example, a UE determines that a current serving node is a first base station. Specifically, a change of a serving cell of the UE is maintained by a mobility management mechanism on a network side, and the UE can determine the current serving node. The first base station may be a macro base station or a micro base station (namely, an LPN). Correspondingly, a UE whose current serving node is an LPN may also be referred to as an LPN UE, and a UE whose current serving node is a macro base station may also be referred to as a MUE.

202. Determine, according to ABS pattern parameters of a second base station, first switching time at which the second base station switches from transmission of a non-ABS subframe to transmission of an ABS subframe, where the second base station has co-channel interference in the first base station.

Usually, the second base station is a macro base station. That the second base station has co-channel interference in the first base station may be that when a cell of the second base station and a cell of the first base station are neighboring cells, a transmit signal of the second base station causes interference to a transmit signal on a same frequency resource and of the first base station. This may cause an impact on performance of a UE when the UE receives and demodulates a signal sent by the first base station. Another typical case is that: when the second base station is a macro base station and the first base station is a micro base station deployed within coverage of a cell of the second base station, a signal sent by the macro base station in the cell causes interference to a signal on a same frequency resource and sent by the micro base station. This may cause an impact on performance of a UE when the UE receives and demodulates the signal of the micro base station.

In this embodiment, changes of aa subframe with strong interference and a subframe with weak interference of the second base station cause interference to the UE whose current serving node is the first base station. A typical scenario is: the first base station is a micro base station, the second base station is a macro base station, and the first base station is within coverage of the second base station. Another typical scenario is: the first base station and the second base station are base stations of two neighboring cells.

An ABS pattern of the second base station is specifically an ABS pattern of sending data on a downlink channel (for example, an HS-PDSCH) by the second base station. Usually, the ABS pattern parameters include: information such as the total number of subframes in an ABS pattern period, positions of an ABS subframe and a non-ABS subframe, and a subframe offset of a first ABS pattern period relative to a frame header. The ABS pattern parameters may be configured by the network side for all UEs within the coverage of the second base station through higher-layer signaling and typically configured by a radio network controller (RNC) for all UEs within the coverage of the second base station through radio resource control (RRC) signaling; or, the radio network controller may notify/configure the ABS pattern parameters of the second base station to/for the second base station and all micro base stations within the coverage of the second base station, and then the second base station and these micro base stations notify/configure the ABS pattern parameters of the second base station to/for all UEs within the coverage of the second base station through physical layer signaling or system broadcast information.

Usually, time in the ABS pattern parameters is aligned with a downlink channel using the ABS pattern. Therefore, for the UE, it is further necessary to map, according to a corresponding time offset, the time included in the ABS pattern parameters to duration of a Primary Common Control Physical Channel (P-CCPCH) of an LPN. Correspondingly, step 202 includes:

determining, according to the ABS pattern parameters of the second base station, a first time point at which the second base station switches from transmission of a non-ABS subframe to transmission of an ABS subframe in a downlink channel using the ABS pattern, and a subframe offset of a first ABS pattern period relative to a frame header;

determining, according to duration of a P-CCPCH of a current serving cell and a time offset of the downlink channel that uses the ABS pattern and is relative to a P-CCPCH, duration of the downlink channel using the ABS pattern; and obtaining the first switching time according to the duration of the downlink channel using the ABS pattern, the subframe offset, and the first time point.

Usually, in a UMTS, the downlink channel using the ABS pattern is an HS-PDSCH. Specifically, the UE may determine the first time point by using the following method:

According to the total number of subframes in an ABS pattern period and positions of an ABS subframe and a non-ABS subframe, which are included in the ABS pattern parameters, offsets of start time and end time of each non-ABS subframe and ABS subframe, which are relative to start time of the first subframe in the ABS pattern period, in each ABS pattern period may be determined. The first time point is also an offset of end time of a non-ABS subframe relative to start time of the first subframe in a corresponding ABS pattern period or an offset of start time of an ABS subframe relative to start time of the first subframe in a corresponding first ABS pattern period, where the non-ABS subframe and the ABS subframe are a non-ABS subframe and an ABS subframe that are adjacent in sequence in each ABS pattern period.

Then, duration of the HS-PDSCH may be determined according to the time offset of the HS-PDSCH relative to the P-CCPCH and the duration of the P-CCPCH of the current serving cell, where the duration of the HS-PDSCH includes start time and end time of each frame header and each subframe; and the start time of the first subframe in the first ABS pattern period may be determined according to the duration of the HS-PDSCH and the subframe offset of the first ABS pattern period relative to the frame header, where the subframe offset is included in the ABS pattern parameters.

Then, the first switching time is obtained according to the start time of the first subframe in the first ABS pattern period and the first time point.

Figure 3:
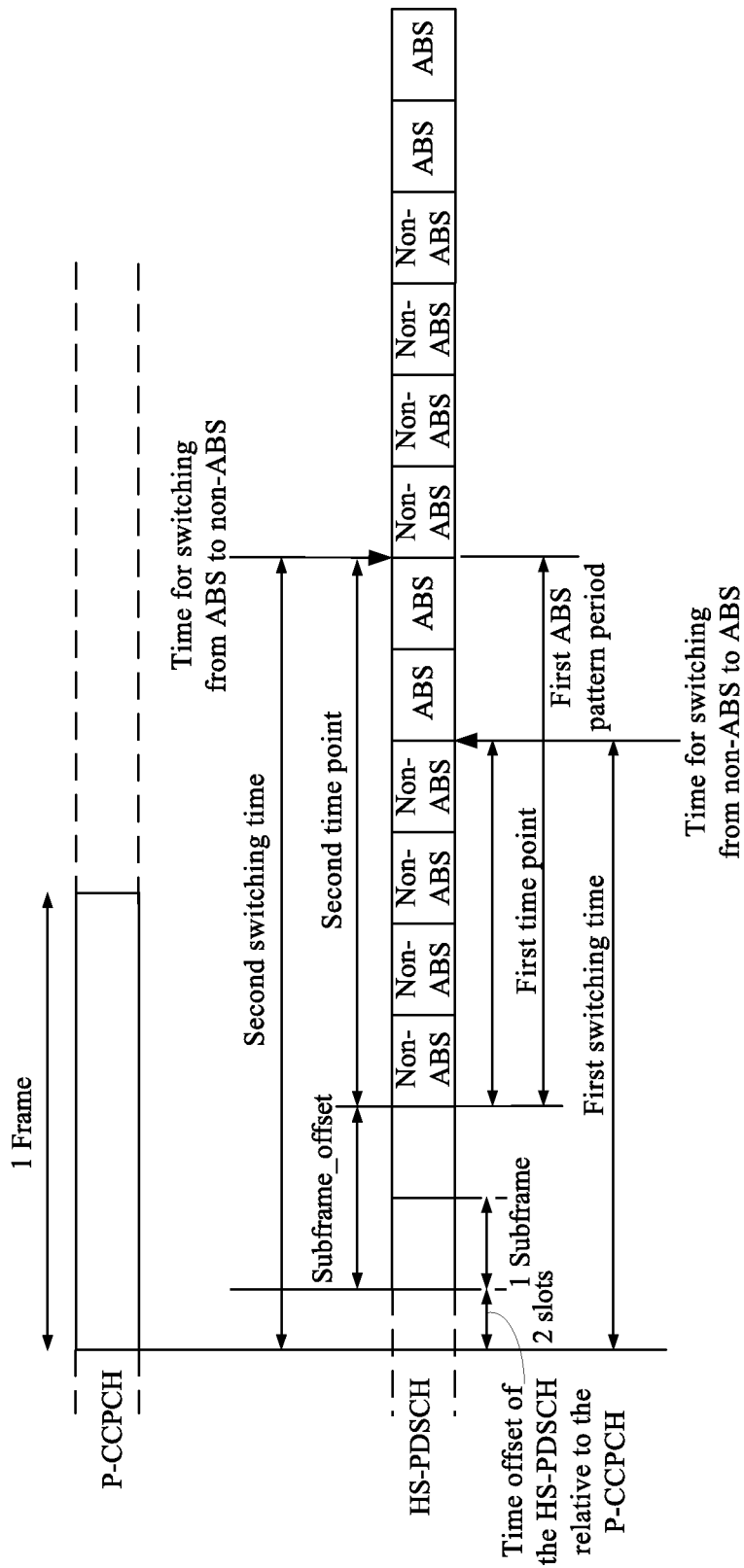
FIG. 3 is a schematic diagram of time according to an embodiment of the present invention.

FIG. 3 is a schematic diagram of time according to an embodiment of the present invention. As shown in FIG. 3, a downlink channel using an ABS pattern and serving as an HS-PDSCH is used as an example, the time offset of the HS-PDSCH relative to the P-CCPCH is 2 time slots, the subframe offset of the first ABS pattern period relative to the frame header is 2 subframes, the first time point is an offset of start time of the fifth subframe in the first ABS pattern period relative to the start time of the first subframe in the first ABS pattern period, and the first switching time is the first time point plus the time offset of the HS-PDSCH relative to the P-CCPCH and the time offset of the first ABS pattern period relative to the frame header, where the time offset of the first ABS pattern period relative to the frame header is equal to the subframe offset of the first ABS pattern period relative to the frame header multiplied by the duration of a subframe of the HS-PDSCH. The duration of a subframe of the HS-PDSCH is usually 2 ms. In addition, a second time point is an offset of end time of the sixth subframe in the first ABS pattern period relative to the start time of the first subframe in the first ABS pattern period, and a second switching time is the second time point plus the time offset of the HS-PDSCH relative to the P-CCPCH and the time offset of the first ABS pattern period relative to the frame header.

It should be noted that a CIPCH and the P-CCPCH are time-aligned and the time offset of the downlink channel that uses the ABS pattern and is relative to the P-CCPCH is equal to a time offset of the downlink channel that uses the ABS pattern and is relative to the CIPCH, and therefore the duration of the downlink channel using the ABS pattern may also be obtained according to the time offset of the downlink channel that uses the ABS pattern and is relative to the CIPCH and duration of a CIPCH of the current serving cell.

It should be additionally noted that in some cases, an ABS technology is also referred to as a restricted resource subframe on power (RRSoP) technology. Correspondingly, in the RRSoP technology, a restricted resource subframe (RRS) is another term referring to an ABS subframe, and the non-RRS is another term referring to a non-ABS subframe.

203. Adjust, at the first switching time, a target SINR value before current switching to obtain a target SINR value of the first switching time, so that the target SINR value of the first switching time is used as an initial target SINR value for performing inner loop power control for the first base station in a transmission time segment of the ABS subframe, where the target SINR value of the first switching time is greater than the target SINR value before current switching.

Usually, in the inner loop power control, the UE controls transmit power of a downlink R99 channel of the first base station according to the target SINR value and an estimated SINR value. Specifically, if the estimated SINR value is less than the target SINR value, the UE instructs, by feeding back a transmit power control up (TPC_UP) command word, the first base station to increase the transmit power; if the estimated SINR value is greater than the target SINR value, the UE instructs, by feeding back a TPC_DOWN command word, the first base station to decrease the transmit power. Meanwhile, the UE further adjusts the target SINR value by outer loop power control, so that the target SINR value adapts to a current service and an actual air interface channel type.

In this embodiment, the first switching time is time at which the second base station switches from the transmission of a non-ABS subframe to the transmission of an ABS subframe; before the first switching time, the second base station transmits the non-ABS subframe. Therefore, the target SINR value before current switching is also a target SINR value used by the UE before the first switching time and at the end of transmitting the non-ABS subframe by the second base station. Specifically, on the basis of the target SINR value before current switching, the target SINR value before current switching may be increased by using a certain algorithm, so as to obtain the target SINR value of the first switching time. Therefore, an abrupt change in the amount of interference of a neighboring cell of the second base station during switching from the non-ABS subframe to the ABS subframe is considered in the inner loop power control as soon as possible. Specifically, step 203 may include: adjusting, at the first switching time according to a first adjustment factor, the target SINR value before current switching to obtain the target SINR value of the first switching time, where the first adjustment factor is obtained according to a power difference between interference in an ABS subframe transmission mode and a non-ABS subframe transmission mode that are used by the second base station.

Because transmit power of an ABS subframe and a non-ABS subframe that are transmitted by the second base station is different, and interference in the UE is also different, how to increase or decrease the target SINR value before switching may be determined according to parameters such as a reference value of a difference value between transmit power of an ABS subframe and a non-ABS subframe that are transmitted by the second base station, so as to obtain the target SINR value of the first switching time or second switching time. Specifically, the adjusting, according to a first adjustment factor, the target SINR value before current switching to obtain the target SINR value of the first switching time includes:

acquiring the target SINR value before current switching and an estimated value of total power of interference and noise before current switching;

estimating interference power of a CPICH of the second base station at the first switching time;

obtaining, according to the total power of interference and noise before current switching, the interference power of the CPICH of the second base station at the first switching time, and a power offset parameter, the first adjustment factor by using formula (1):

$$L1 = \frac{Ioc_{pre-t1}}{Ioc_{pre-t1} - I_{NB2,CPICH,t1} * PO} \quad (1)$$

where, L1 represents the first adjustment factor, $Ioc_{pre-t1}$ represents the estimated value of the total power of interference and noise before current switching, $I_{NB2,CPICH,t1}$ represents the interference power of the CPICH of the second base station at the first switching time, PO represents the power offset parameter, $I_{NB2,CPICH,t1}*PO$ represents the difference between interference in an ABS subframe sending mode and a non-ABS subframe sending mode that are used by the second base station, and the power offset parameter is a ratio of a reference value of a difference value between transmit power of an ABS subframe and a non-ABS subframe that are transmitted by the second base station to transmit power of the CPICH; and multiplying the target SINR value before current switching by the first adjustment factor to obtain the target SINR value of the first switching time.

Specifically, the power offset parameter may be obtained through network-side configuration or estimation. The network side may configure the PO for all UEs within the coverage of the second base station through higher-layer signaling or physical layer signaling. Preferably, the network side configures the ABS pattern parameters of the second base station, together with the PO, for the UE. In addition, the UE may estimate the PO by itself according to history information.

According to formula (1), the target SINR value before current switching and the target SINR value of the first switching time satisfy:

$$SINR_{target,t1} = SINR_{target,pre-t1} * \frac{Ioc_{pre-t1}}{Ioc_{pre-t1} - I_{NB2,CPICH,t1} * PO} \quad (2)$$

where, $SINR_{target,t1}$ represents the target SINR value of the first switching time, and $SINR_{target,pre-t1}$ represents the target SINR value before current switching.

Formula (2) may also be expressed as:

$$(SINR_{target,t1})dB =$$
$$(SINR_{target,pre-t1})dB + 10 * \log\frac{Ioc_{pre-t1}}{Ioc_{pre-t1} - I_{NB2,CPICH,t1} * PO} \quad (3)$$

That is, an operation of multiplying the target SINR value before current switching in a linear domain by the first adjustment factor is changed to an operation of adding a dB value corresponding to the first adjustment factor to the target SINR value before current switching in a Decibel (dB) domain.

Specifically, total power of interference and noise in the first or several slots before the first switching time may be estimated to obtain the estimated value of the total power of interference and noise before current switching. Usually, the total power of interference and noise is the sum of interference power from the second base station, other interference power, and thermal noise power. Further, according to a target of the inner loop power control, the target SINR value before current switching, namely, the target SINR value $SINR_{target,t1}$ before time of entering an ABS subframe, usually satisfies:

$$SINR_{target,pre-t1} = \frac{P_{exp} * |h_{NB1}|^2}{I_{NB2,pre-t1} + I_{other,pre-t1} + N0} = \frac{P_{rx,exp}}{Ioc_{pre-t1}} \quad (4)$$

where, $P_{exp}$ represents expected transmit power of the R99 channel of the first base station for reaching the target SINR value before current switching, $|h_{NB1}|$ represents a representation of a complex number of the R99 channel from the first base station to the UE, $I_{NB2,pre-t1}$ represents interference power of the second base station to the UE before current switching, $I_{other}$ represents interference power of another base station to the UE, N0 represents thermal noise power, and $P_{rx,exp}$ represents interference power expected by the UE.

At the first switching time, namely, at the time of entering an ABS subframe, to compensate for an impact caused by an interference change of a neighboring cell of the second base station, the target SINR value before the first switching time is adjusted to obtain the target SINR value of the first switching time, so that the expected transmit power $P_{exp}$ of the R99 channel of the first base station for reaching the target SINR value of the first switching time does not change greatly after switching. Therefore, the target SINR value of the first switching time needs to satisfy:

$$SINR_{target,t1} = \frac{P_{exp} * |h_{NB1}|^2}{Ioc_{pre-t1} - P_{NB2,CPICH,t1} * |h_{NB2}|^2 * PO} = \quad (5)$$
$$\frac{P_{rx,exp}}{Ioc_{pre-t1} - I_{NB2,CPICH,t1} * PO}$$

where, $P_{NB2,CPICH,t1}$ represents transmit power of the CPICH of the second base station at the first switching time, and $h_{NB2}$ represents a representation of a complex number of the CPICH from the second base station to the EU. Formula (2) may be obtained according to the above formula (4) and formula (5).

Further, this embodiment further includes:

determining, according to the ABS pattern parameters of the second base station, second switching time at which the second base station switches from transmission of an ABS subframe to transmission of a non-ABS subframe; and adjusting, at the second switching time, a target SINR value before current switching to obtain a target SINR value of the second switching time, so that the target SINR value of the second switching time is used as an initial target SINR value for performing inner loop power control for the first base station in a transmission time segment of the non-ABS subframe, where the target SINR value of the second switching time is less than the target SINR value before current switching.

Specifically, the second switching time is time at which the second base station switches from transmission of an ABS subframe to transmission of a non-ABS subframe; before the second switching time, the second base station transmits an ABS subframe. Therefore, the target SINR value before current switching is also a target SINR value used by the UE before the second switching time and at the end of transmitting the ABS subframe by the second base station. Specifically, on the basis of the target SINR value before current switching, the target SINR value before current switching may be decreased by using a certain algorithm, so as to obtain the target SINR value of the second switching time. Therefore, an abrupt change in the amount of interference of a neighboring cell of the second base station during switching from the non-ABS subframe to the ABS subframe is considered in the inner loop power control as soon as possible. For example, the target SINR value before current switching is adjusted according to a second adjustment factor at the second switching time, so as to obtain the target SINR value of the second switching time, where the second adjustment factor is obtained according to a power difference between interference in an ABS subframe transmission mode and a non-ABS subframe transmission mode that are used by the second base station.

Corresponding to the obtaining the first adjustment factor by using formula (1) to obtain the target SINR value of the first switching time, the second adjustment factor may be obtained by the following steps, so as to obtain the target SINR value of the second switching time:

acquiring the target SINR value before current switching and an estimated value of total power of interference and noise before current switching;

estimating interference power of the CPICH of the second base station at the second switching time;

obtaining, according to the total power of interference and noise before current switching, the interference power of the CPICH of the second base station at the second switching time, and the power offset parameter, the second adjustment factor by using formula (6):

$$L2 = \frac{Ioc_{pre\text{-}t2}}{Ioc_{pre\text{-}t2} + I_{NB2,CPICH,t2} * PO} \quad (6)$$

where, L2 represents the second adjustment factor, $Ioc_{pre\text{-}t2}$ represents the estimated value of the total power of interference and noise before current switching, $I_{NB2,CPICH,t2}$ represents the interference power of the CPICH of the second base station at the second switching time, PO represents the power offset parameter, and $I_{NB2,CPICH,t2}*PO$ represents the difference between interference in an ABS subframe sending mode and a non-ABS subframe sending mode that are used by the second base station; and multiplying the target SINR value before current switching by the second adjustment factor to obtain the target SINR value of the second switching time.

According to formula (6), the target SINR value before current switching and the target SINR value of the second switching time satisfy:

$$SINR_{target,t2} = SINR_{target,pre\text{-}t2} * \frac{Ioc_{pre\text{-}t2}}{Ioc_{pre\text{-}t2} + I_{NB2,CPICH,t2} * PO} \quad (7)$$

where, $SINR_{target,t2}$ represents the target SINR value of the second switching time, and $SINR_{target,pre\text{-}t2}$ represents the target SINR value before current switching.

Formula (7) may also be expressed as:

$$(SINR_{target,t2})dB = \quad (8)$$
$$(SINR_{target,pre\text{-}t2})dB + 10 * \log\frac{Ioc_{pre\text{-}t2}}{Ioc_{pre\text{-}t2} + I_{NB2,CPICH,t2} * PO}$$

Optionally, there is a high requirement on the UE when the difference between interference is estimated in real time by using the foregoing formulas and an adjustment factor of the target SINR value during switching of aa subframe with strong interference and a subframe with weak interference is calculated based on the estimated difference between interference. Therefore, optionally, a fixed difference between interference is preconfigured during network planning; then the network side configures the fixed difference between interference for all UEs within the coverage of the second base station; and the UE calculates the adjustment factor according to the configured fixed difference between interference. Specifically, step 203 includes:

at the first switching time, acquiring the target SINR value before current switching and the difference between interference in an ABS subframe sending mode and a non-ABS subframe sending mode that are used by the second base station, where the difference is configured by the network side;

determining the first adjustment factor according to the difference between interference in an ABS subframe sending mode and a non-ABS subframe sending mode that are used by the second base station; and multiplying the target SINR value before current switching by the first adjustment factor to obtain the target SINR value of the first switching time.

Correspondingly, at the time of entering a non-ABS subframe from an ABS subframe, namely, at the second switching time:

acquiring the target SINR value before current switching and the difference between interference in an ABS subframe sending mode and a non-ABS subframe sending mode that are used by the second base station, where the difference is configured by the network side;

determining the second adjustment factor according to the difference between interference in an ABS subframe sending mode and a non-ABS subframe sending mode that are used by the second base station; and multiplying the target SINR value before current switching by the second adjustment factor to obtain the target SINR value of the second switching time.

Specifically, for the methods for determining the first adjustment factor and the second adjustment factor according to the difference between interference in an ABS subframe sending mode and a non-ABS subframe sending mode that are used by the second base station, where the difference is configured by the network side, reference may be made to formula (1) and formula (6). It should be noted that: the difference between interference in formula (1) is $I_{NB2,CPICH,t1}*PO$, and the difference between interference in formula (6) is $I_{NB2,CPICH,t2}*PO$. The network side may correspondingly configure two fixed differences between interference or configure a fixed difference between interference close to both $I_{NB2,CPICH,t1}*PO$ and $I_{NB2,CPICH,t2}*PO$.

It should be noted that no matter which mode is used to obtain the target SINR value of the first switching time or second switching time, in the transmission time segment of the ABS subframe after the first switching time and in the transmission time segment of the non-ABS subframe after the second switching time, transmit power of the LPN and the target SINR value still need to be adjusted according to the existing inner and outer loop power control.

Further, the ABS pattern is usually periodic, that is, after completion of transmission of all ABS and non-ABS subframes in one ABS pattern period, ABS and non-ABS subframes in the next ABS pattern period start to be transmitted. Correspondingly, the target SINR value needs to be adjusted at the switching time of each ABS pattern period. Specifically, the determining, according to the ABS pattern parameters of the second base station, a first time point at which the second base station switches from transmission of a non-ABS subframe to transmission of an ABS subframe in a downlink channel using the ABS pattern includes:

determining, according to the ABS pattern parameters of the second base station, a first time point of each ABS pattern period and a subframe offset of a first ABS pattern period relative to a frame header;

the obtaining the first switching time according to the duration of the downlink channel using the ABS pattern, the subframe offset, and the first time point includes:

obtaining first switching time of each ABS pattern period according to the duration of the downlink channel using the ABS pattern, the subframe offset, and the first time point of each ABS pattern period; and step 203 includes:

adjusting, at the first switching time of each ABS pattern period, the target signal to SINR value before current switching to obtain the target SINR value of the first switching time.

Correspondingly, the determining, according to the ABS pattern parameters of the second base station, second switching time at which the second base station switches from transmission of an ABS subframe to transmission of a non-ABS subframe includes:

determining, according to the ABS pattern parameters of the second base station, a second time point at which the second base station switches from transmission of an ABS subframe to transmission of a non-ABS subframe in the downlink channel using the ABS pattern, and a subframe offset of a first ABS pattern period relative to a frame header;

determining, according to a time offset of the downlink channel that uses the ABS pattern and is relative to a P-CCPCH and duration of a P-CCPCH of a current serving cell, duration of the downlink channel using the ABS pattern; and obtaining the second switching time according to the duration of the downlink channel using the ABS pattern, the subframe offset, and the second time point.

Further, the determining, according to the ABS pattern parameters of the second base station, a second time point at which the second base station switches from transmission of an ABS subframe to transmission of a non-ABS subframe in a downlink channel using the ABS pattern includes:

determining a second time point of each ABS pattern period according to the ABS pattern parameters of the second base station;

the obtaining the second switching time according to the duration of the downlink channel using the ABS pattern, the subframe offset, and the second time point includes:

obtaining second switching time of each ABS pattern period according to the duration of the downlink channel using the ABS pattern, the subframe offset, and the second time point of each ABS pattern period; and the adjusting, at the second switching time, a target SINR value before current switching to obtain a target SINR value of the second switching time includes:

adjusting, at the second switching time of each ABS pattern period, the target SINR value before current switching to obtain the target SINR value of the second switching time.

In this embodiment of the present invention, a target SINR value is adjusted to a larger value at first switching time at which a second base station switches from transmission of a non-ABS subframe to transmission of an ABS subframe, and the adjusted target SINR value is used as an initial target SINR value for performing inner loop power control for a first base station in a transmission time segment of the ABS subframe. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel. Further, the target SINR value can also be adjusted according to a power difference between interference in an ABS subframe transmission mode and a non-ABS subframe transmission mode that are used by the second base station, thereby further optimizing the effect of compensation.

Figure 4:
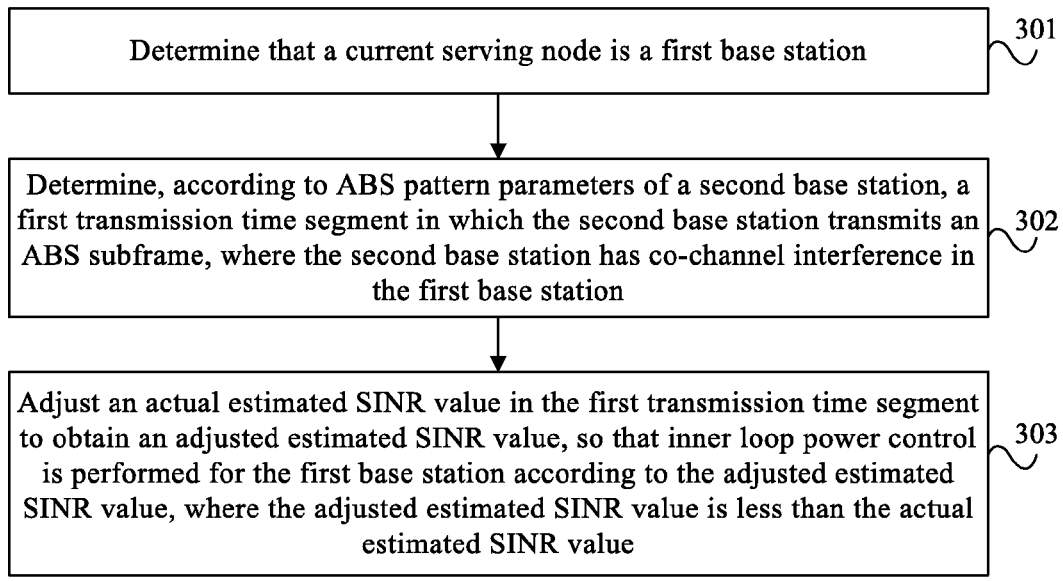
FIG. 4 is a schematic flowchart of a method for power control according to a second embodiment of the present invention.

FIG. 4 is a schematic flowchart of a method for power control according to a second embodiment of the present invention. As shown in FIG. 4, the method includes:

301. Determine that a current serving node is a first base station.

For example, a UE determines that a current serving node is a first base station. Specifically, a change of a serving cell of the UE is maintained by a mobility management mechanism on a network side, and the UE can determine the current serving node. The first base station may be a macro base station or a micro base station (namely, an LPN). Correspondingly, a UE whose current serving node is an LPN may also be referred to as an LPN UE, and a UE whose current serving node is a macro base station may also be referred to as a MUE.

302. Determine, according to ABS pattern parameters of a second base station, a first transmission time segment in which the second base station transmits an ABS subframe, where the second base station has co-channel interference in the first base station.

Usually, the second base station is a macro base station. That the second base station has co-channel interference in the first base station may be that when a cell of the second base station and a cell of the first base station are neighboring cells, a transmit signal of the second base station causes interference to a transmit signal on a same frequency resource and of the first base station. This may cause an impact on performance of a UE when the UE receives and demodulates a signal sent by the first base station. Another typical case is that: when the second base station is a macro base station and the first base station is a micro base station deployed within coverage of a cell of the second base station, a signal sent by the macro base station in the cell causes interference to a signal on a same frequency resource and sent by the micro base station. This may cause an impact on performance of a UE when the UE receives and demodulates the signal of the micro base station.

In this embodiment, changes of aa subframe with strong interference and a subframe with weak interference of the second base station cause interference to the UE whose current serving node is the first base station. A typical scenario is: the first base station is a micro base station, the second base station is a macro base station, and the first base station is within coverage of the second base station. Another typical scenario is: the first base station and the second base station are base stations of two neighboring cells.

An ABS pattern of the second base station is specifically an ABS pattern of sending data on a downlink channel by the second base station. Usually, the ABS pattern parameters include: information such as the total number of subframes in an ABS pattern period, positions of an ABS subframe and a non-ABS subframe, and a subframe offset of a first ABS pattern period relative to a frame header. The ABS pattern parameters may be configured by the network side for all UEs within the coverage of the second base station through higher-layer signaling and typically configured by an RNC for all UEs within the coverage of the second base station through RRC signaling; or, the radio network controller may notify/configure the ABS pattern parameters of the second base station to/for the second base station and all micro base stations within the coverage of the second base station, and then the second base station and these micro base stations notify/configure the ABS pattern parameters of the second base station to/for all UEs within the coverage of the second base station through physical layer signaling or system broadcast information.

Usually, time in the ABS pattern is aligned with a downlink channel (for example, an HS-PDSCH) using the ABS pattern. Therefore, for the UE, it is further necessary to map, according to a corresponding time offset, the time included in the ABS pattern to duration of a P-CCPCH of an LPN. Correspondingly, step 302 includes:

determining, according to the ABS pattern parameters of the second base station, a first time segment in which the second base station transmits an ABS subframe in a downlink channel using the ABS pattern, and a subframe offset of a first ABS pattern period relative to a frame header;

determining, according to duration of a P-CCPCH of a current serving cell and a time offset of the downlink channel that uses the ABS pattern and is relative to a P-CCPCH, duration of the downlink channel using the ABS pattern; and obtaining the first transmission time segment according to the duration of the downlink channel using the ABS pattern, the subframe offset, and the first time segment.

Usually, in a UMTS, the downlink channel using the ABS pattern is an HS-PDSCH. Specifically, the UE may determine, by using the following method, the first time segment in which the second base station transmits an ABS subframe in a downlink channel using the ABS pattern: According to the total number of subframes in an ABS pattern period and positions of an ABS subframe and a non-ABS subframe, which are included in the ABS pattern parameters, offsets of start time and end time of each non-ABS subframe and ABS subframe, which are relative to start time of the first subframe in the ABS pattern period, in each ABS pattern period may be determined, so that offsets of start time and end time of transmitting an ABS subframe, which are relative to the start time of the first subframe in the first ABS pattern period, in each ABS pattern period, namely, the first time segment, can be determined.

Then, duration of the HS-PDSCH may be determined according to the time offset of the HS-PDSCH relative to the P-CCPCH and the duration of the P-CCPCH of the current serving cell, where the duration of the HS-PDSCH includes start time and end time of each frame header and each subframe; and the start time of the first subframe in the first ABS pattern period may be determined according to the duration of the HS-PDSCH and the subframe offset of the first ABS pattern period relative to the frame header, where the subframe offset is included in the ABS pattern parameters.

Then, the first transmission time segment is obtained according to the start time of the first subframe in the first ABS pattern period and the first time segment.

It should be noted that a CIPCH and the P-CCPCH are time-aligned and the time offset of the downlink channel that uses the ABS pattern and is relative to the P-CCPCH is equal to a time offset of the downlink channel that uses the ABS pattern and is relative to the CIPCH, and therefore the duration of the downlink channel using the ABS pattern may also be obtained according to the time offset of the downlink channel that uses the ABS pattern and is relative to the CIPCH and duration of a CIPCH of the current serving cell.

303. Adjust an actual estimated SINR value in the first transmission time segment to obtain an adjusted estimated SINR value, so that inner loop power control is performed for the first base station according to the adjusted estimated SINR value, where the adjusted estimated SINR value is less than the actual estimated SINR value.

Usually, in the inner loop power control, the UE controls transmit power of a downlink R99 channel of the first base station according to the target SINR value and the estimated SINR value. Specifically, if the estimated SINR value is less than the target SINR value, the UE instructs, by feeding back a TPC_UP command word, the first base station to increase the transmit power; if the estimated SINR value is greater than the target SINR value, the UE instructs, by feeding back a TPC_DOWN command word, the first base station to decrease the transmit power. Meanwhile, the UE further adjusts the target SINR value by outer loop power control, so that the target SINR value adapts to a current service and an actual air interface channel type. In this embodiment, the adjusted estimated SINR value less than the actual estimated SINR value is used to perform inner loop power control. Specifically, the adjusted estimated SINR value is compared with the target SINR value to determine whether to adjust the transmit power of the first base station.

Specifically, on the basis of the actual estimated SINR value obtained through estimation in the first transmission time segment, the actual estimated SINR value may be decreased by using a certain algorithm, so as to obtain the adjusted estimated SINR value. Therefore, an impact caused by an abrupt reduction of neighboring cell interference of the second base station due to entering an ABS subframe can be considered in the inner loop power control as soon as possible. Specifically, step 303 may include: adjusting, in the first transmission time segment according to a power difference between interference in an ABS subframe transmission mode and a non-ABS subframe transmission mode that are used by the second base station, the actual estimated SINR value to obtain the adjusted estimated SINR value.

Because transmit power of an ABS subframe and a non-ABS subframe that are transmitted by the second base station is different and interference in the UE is also different, the difference between interference in an ABS subframe sending mode and a non-ABS subframe sending mode that are used by the second base station can be determined according to parameters such as a reference value of a difference value between transmit power of an ABS subframe and a non-ABS subframe that are transmitted by the second base station, so as to obtain the adjusted estimated SINR value. Specifically, step 303 includes:

separately estimating a current SINR, current total power of interference and noise, and current interference power of a CPICH of the second base station in the first transmission time segment to obtain the actual estimated SINR value, an estimated value of the total power of interference and noise, and the current interference power of the CPICH of the second base station; and obtaining, according to the actual estimated SINR value, the estimated value of the total power of interference and noise, the current interference power of the CPICH of the second base station, and a power offset parameter, the adjusted estimated SINR value by using formula (9):

$$SINR_{fake} = SINR_{est} * \frac{Ioc_{est}}{Ioc_{est} + I_{NB2,CPICH,cur} * PO} \quad (9)$$

where, $SINR_{est}$ represents the actual estimated SINR value, $SINR_{fake}$ represents the adjusted estimated SINR value, $Ioc_{est}$ represents the estimated value of the total power of interference and noise, $I_{NB2,CPICH,cur}$ represents the current interference power of the CPICH of the second base station, PO represents the power offset parameter, $I_{NB2,CPICH,cur}*PO$ represents the difference between interference in an ABS subframe sending mode and a non-ABS subframe sending mode that are used by the second base station, and the power offset parameter is a ratio of a reference value of a difference value between transmit power of an ABS subframe and a non-ABS subframe that are transmitted by the second base station to transmit power of the CPICH.

Specifically, the power offset parameter may be obtained through network-side configuration or self-estimation. The network side may configure the PO for all UEs within the coverage through higher-layer signaling or physical layer signaling. Preferably, the network side configures the ABS pattern parameters of the second base station, together with the PO, for the UE. In addition, the LPN UE may estimate the PO by itself according to history information.

Formula (9) may also be expressed as:

$$(SINR_{fake})dB = (SINR_{est})dB + 10\log\frac{Ioc_{est}}{Ioc_{est} + I_{NB2,CPICH,cur} * PO} \quad (10)$$

Alternatively, in the process of estimating the SINR, the difference between interference in an ABS subframe sending mode and a non-ABS subframe sending mode that are used by the second base station may be directly considered as a part of the total power of interference and noise. Correspondingly, the adjusting, according to a power difference between interference in an ABS subframe transmission mode and a non-ABS subframe transmission mode that are used by the second base station, the actual estimated SINR value to obtain the adjusted estimated SINR value includes:

adding the difference between interference in an ABS subframe sending mode and a non-ABS subframe sending mode that are used by the second base station to power of interference and noise actually obtained through estimation, and using the sum as adjusted total power of interference and noise; and obtaining, through calculation, the adjusted estimated SINR value according to the adjusted total power of interference and noise.

Further, this embodiment further includes:

determining, according to the ABS pattern of the second base station, a second transmission time segment in which the second base station transmits a non-ABS subframe; and performing inner loop power control for the first base station in the second transmission time segment according to the actual estimated value.

Specifically, in the transmission time segment in which the second base station transmits a non-ABS subframe, the UE compares the actual estimated SINR value with the target SINR value according to a conventional manner, so as to determine whether to adjust the transmit power of the R99 channel of the LPN.

Further, the ABS pattern is usually periodic, that is, after completion of transmission of all ABS and non-ABS subframes in one ABS pattern period, ABS and non-ABS subframes in the next ABS pattern period start to be transmitted. Correspondingly, the estimated SINR value needs to be adjusted in a time segment of transmission of an ABS subframe in each ABS pattern period. Specifically, the determining, according to the ABS pattern parameters of the second base station, a first time segment in which the second base station transmits an ABS subframe in a downlink channel using the ABS pattern includes:

determining, according to the ABS pattern parameters of the second base station, the first time segment in each ABS pattern period;

the obtaining the first transmission time segment according to the duration of the downlink channel using the ABS pattern, the subframe offset, and the first time segment includes:

obtaining a first transmission time segment in each ABS pattern period according to the duration of the downlink channel using the ABS pattern, the subframe offset, and the first time segment in each ABS pattern period; and correspondingly, step 303 includes:

adjusting the actual estimated SINR value in the first transmission time segment in each ABS pattern period to obtain the adjusted estimated SINR value.

In this embodiment of the present invention, in a first transmission time segment in which a second base station transmits an ABS subframe, an adjusted estimated SINR value less than an actual estimated SINR value is used to perform inner loop power control for a first base station. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel. Further, the estimated SINR value can also be adjusted according to a power difference between interference in an ABS subframe transmission mode and a non-ABS subframe transmission mode that are used by the second base station, thereby further optimizing the effect of compensation.

Figure 5:
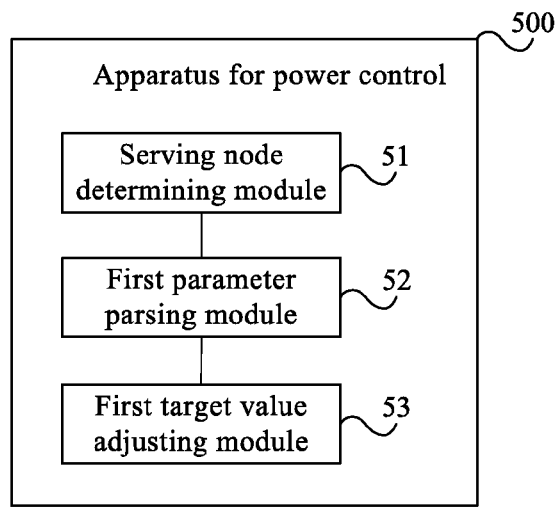
FIG. 5 is a schematic structural diagram of an apparatus for power control according to a third embodiment of the present invention.

FIG. 5 is a schematic structural diagram of an apparatus 500 for power control according to a third embodiment of the present invention. As shown in FIG. 5, the apparatus includes:

a serving node determining module 51, adapted to determine that a current serving node is a first base station;

a first parameter parsing module 52, adapted to determine, according to ABS pattern parameters of a second base station, first switching time at which the second base station switches from transmission of a non-ABS subframe to transmission of an ABS subframe, where the second base station has co-channel interference in the first base station; and a first target value adjusting module 53, adapted to adjust, at the first switching time, a target SINR value before current switching to obtain a target SINR value of the first switching time, so that the target SINR value of the first switching time is used as an initial target SINR value for performing inner loop power control for the first base station in a transmission time segment of the ABS subframe, where the target SINR value of the first switching time is greater than the target SINR value before current switching.

Further, the apparatus 500 for power control further includes:

a second parameter parsing module, adapted to determine, according to the ABS pattern parameters of the second base station, second switching time at which the second base station switches from transmission of an ABS subframe to transmission of a non-ABS subframe; and a second target value adjusting module, adapted to adjust, at the second switching time, a target SINR value before current switching to obtain a target SINR value of the second switching time, so that the target SINR value of the second switching time is used as an initial target SINR value for performing inner loop power control for the first base station in a transmission time segment of the non-ABS subframe, where the target SINR value of the second switching time is less than the target SINR value before current switching.

Optionally, the first target value adjusting module 53 is specifically adapted to adjust, at the first switching time according to a first adjustment factor, the target SINR value before current switching to obtain the target SINR value of the first switching time, where the first adjustment factor is obtained according to a power difference between interference in an ABS subframe transmission mode and a non-ABS subframe transmission mode that are used by the second base station.

Correspondingly, the second target value adjusting module is specifically adapted to adjust, at the second switching time according to a second adjustment factor, the target SINR value before current switching to obtain the target SINR value of the second switching time, where the second adjustment factor is obtained according to a power difference between interference in an ABS subframe transmission mode and a non-ABS subframe transmission mode that are used by the second base station.

Further, the first target value adjusting module 53 is specifically adapted to:

acquire the target SINR value before current switching and an estimated value of total power of interference and noise before current switching;

estimate interference power of a CPICH of the second base station at the first switching time;

obtain, according to the estimated value of the total power of interference and noise before current switching, the interference power of the CPICH of the second base station at the first switching time, and a power offset parameter, the first adjustment factor by using the following formula:

$$L1 = \frac{Ioc_{pre-t1}}{Ioc_{pre-t1} - I_{NB2,CPICH,t1} * PO}$$

where, L1 represents the first adjustment factor, $Ioc_{pre-t1}$ represents the estimated value of the total power of interference and noise before current switching, $I_{NB2,CPICH,t1}$ represents the interference power of the CPICH of the second base station at the first switching time, PO represents the power offset parameter, $I_{NB2,CPICH,t1}*PO$ represents the difference between interference in an ABS subframe sending mode and a non-ABS subframe sending mode that are used by the second base station, and the power offset parameter is a ratio of a reference value of a difference value between transmit power of an ABS subframe and a non-ABS subframe that are transmitted by the second base station to transmit power of the CPICH; and multiply the target SINR value before current switching by the first adjustment factor to obtain the target SINR value of the first switching time.

Correspondingly, the second target value adjusting module is specifically adapted to:

acquire the target SINR value before current switching and an estimated value of total power of interference and noise before current switching;

estimate interference power of the CPICH of the second base station at the second switching time;

obtain, according to the total power of interference and noise before current switching, the interference power of the CPICH of the second base station at the second switching time, and the power offset parameter, the second adjustment factor by using the following formula:

$$L2 = \frac{Ioc_{pre-t2}}{Ioc_{pre-t2} + I_{NB2,CPICH,t2} * PO}$$

where, L2 represents the second adjustment factor, $Ioc_{pre-2}$ represents the total power of interference and noise before current switching, $I_{NB2,CPICH,t2}$ represents the interference power of the CPICH of the second base station at the second switching time, PO represents the power offset parameter, and $I_{NB2,CPICH,t2}*PO$ represents the difference between interference in an ABS subframe sending mode and a non-ABS subframe sending mode that are used by the second base station; and multiply the target SINR value before current switching by the second adjustment factor to obtain the target SINR value of the second switching time.

The power offset parameter may be obtained through estimation or network-side configuration.

Optionally, the first target value adjusting module 53 is specifically adapted to:

acquire the target SINR value before current switching and the difference between interference in an ABS subframe sending mode and a non-ABS subframe sending mode that are used by the second base station, where the difference is configured by a network side;

determine the first adjustment factor according to the difference between interference in an ABS subframe sending mode and a non-ABS subframe sending mode that are used by the second base station; and multiply the target SINR value before current switching by the first adjustment factor to obtain the target SINR value of the first switching time.

Correspondingly, the second target value adjusting module is specifically adapted to:

acquire the target SINR value before current switching and the difference between interference in an ABS subframe sending mode and a non-ABS subframe sending mode that are used by the second base station, where the difference is configured by the network side;

determine the second adjustment factor according to the difference between interference in an ABS subframe sending mode and a non-ABS subframe sending mode that are used by the second base station; and multiply the target SINR value before current switching by the second adjustment factor to obtain the target SINR value of the second switching time.

Further, the first parameter parsing module 52 specifically includes:

a first parameter parsing unit, adapted to determine, according to the ABS pattern parameters of the second base station, a first time point at which the second base station switches from transmission of a non-ABS subframe to transmission of an ABS subframe in a downlink channel using the ABS pattern, and a subframe offset of a first ABS pattern period relative to a frame header;

a first channel aligning unit, adapted to determine, according to duration of a P-CCPCH of a current serving cell and a time offset of the downlink channel that uses the ABS pattern and is relative to a P-CCPCH, duration of the downlink channel using the ABS pattern; and a first time aligning unit, adapted to obtain the first switching time according to the duration of the downlink channel using the ABS pattern, the subframe offset, and the first time point.

Further, the first parameter parsing unit is specifically adapted to determine, according to the ABS pattern parameters of the second base station, a first time point of each ABS pattern period and a subframe offset of a first ABS pattern period relative to a frame header;

the time aligning unit is specifically adapted to obtain first switching time of each ABS pattern period according to the duration of the downlink channel using the ABS pattern, the subframe offset, and the first time point of each ABS pattern period; and the first target value adjusting module 53 is specifically adapted to adjust, at the first switching time of each ABS pattern period, the target SINR value before current switching to obtain the target SINR value of the first switching time.

Correspondingly, the second parameter parsing module specifically includes:

a second parameter parsing unit, adapted to determine, according to the ABS pattern parameters of the second base station, a second time point at which the second base station switches from transmission of an ABS subframe to transmission of a non-ABS subframe in the downlink channel using the ABS pattern, and a subframe offset of a first ABS pattern period relative to a frame header;

a second channel aligning unit, adapted to determine, according to a time offset of the downlink channel that uses the ABS pattern and is relative to a P-CCPCH and duration of a P-CCPCH of a current serving cell, duration of the downlink channel using the ABS pattern; and a second time aligning unit, adapted to obtain the second switching time according to the duration of the downlink channel using the ABS pattern, the subframe offset, and the second time point.

Further, the second parameter parsing unit is specifically adapted to determine, according to the ABS pattern parameters of the second base station, a second time point of each ABS pattern period and a subframe offset of a first ABS pattern period relative to a frame header;

the second time aligning unit is specifically adapted to obtain second switching time of each ABS pattern period according to the duration of the downlink channel using the ABS pattern, the subframe offset, and the second time point of each ABS pattern period; and the second target value adjusting module is specifically adapted to adjust, at the second switching time of each ABS pattern period, the target signal to SINR value before current switching to obtain the target SINR value of the second switching time.

For a specific implementation of this embodiment, refer to the method for power control according to the first embodiment of the present invention. In this embodiment of the present invention, a target SINR value is adjusted to a larger value at first switching time at which a second base station switches from transmission of a non-ABS subframe to transmission of an ABS subframe, and the adjusted target SINR value is used as an initial target SINR value for performing inner loop power control for a first base station in a transmission time segment of the ABS subframe. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel. Further, the target SINR value can also be adjusted according to a power difference between interference in an ABS subframe transmission mode and a non-ABS subframe transmission mode that are used by the second base station, thereby further optimizing the effect of compensation.

Figure 6:
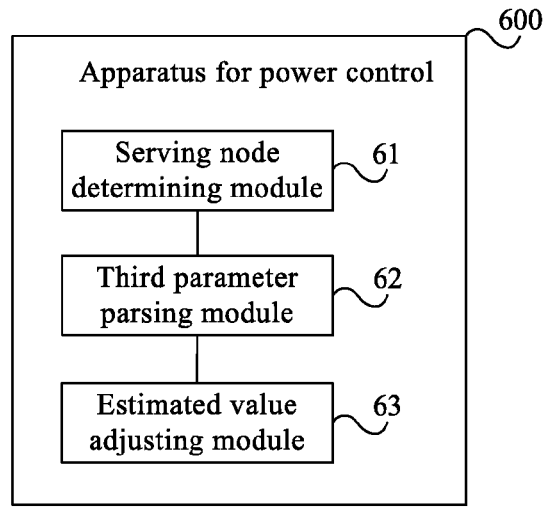
FIG. 6 is a schematic structural diagram of an apparatus for power control according to a fourth embodiment of the present invention.

FIG. 6 is a schematic structural diagram of an apparatus 600 for power control according to a fourth embodiment of the present invention. As shown in FIG. 6, the apparatus includes:

a serving node determining module 61, adapted to determine that a current serving node is a first base station;

a third parameter parsing module 62, adapted to determine, according to ABS pattern parameters of a second base station, a first transmission time segment in which the second base station transmits an ABS subframe, where the second base station has co-channel interference in the first base station; and an estimated value adjusting module 63, adapted to adjust an actual estimated SINR value in the first transmission time segment to obtain an adjusted estimated SINR value, so that inner loop power control is performed for the first base station according to the adjusted estimated SINR value, where the adjusted estimated SINR value is less than the actual estimated SINR value.

Optionally, the estimated value adjusting module 63 is specifically adapted to:

adjust, in the first transmission time segment according to a power difference between interference in an ABS subframe transmission mode and a non-ABS subframe transmission mode that are used by the second base station, the actual estimated SINR value to obtain the adjusted estimated SINR value.

Further, the estimated value adjusting module 63 is specifically adapted to:

separately estimate a current SINR, current total power of interference and noise, and current interference power of a CPICH of the second base station in the first transmission time segment to obtain the actual estimated SINR value, an estimated value of the total power of interference and noise, and the current interference power of the CPICH of the second base station; and obtain, according to the actual estimated SINR value, the estimated value of the total power of interference and noise, the current interference power of the CPICH of the second base station, and a power offset parameter, the adjusted estimated SINR value by using the following formula:

$$SINR_{fake} = SINR_{est} * \frac{Ioc_{est}}{Ioc_{est} + I_{NB2,CPICH,cur} * PO}$$

where, $SINR_{est}$ represents the actual estimated SINR value, $SINR_{fake}$ represents the adjusted estimated SINR value, $Ioc_{est}$ represents the estimated value of the total power of interference and noise, $I_{NB2,CPICH,cur}$ represents the current interference power of the CPICH of the second base station, PO represents the power offset parameter, $I_{NB2,CPICH,cur}*PO$ represents the difference between interference in an ABS subframe sending mode and a non-ABS subframe sending mode that are used by the second base station, and the power offset parameter is a ratio of a reference value of a difference value between transmit power of an ABS subframe and a non-ABS subframe that are transmitted by the second base station to transmit power of the CPICH.

The power offset parameter may be obtained through estimation or network-side configuration.

Optionally, the estimated value adjusting module 63 is specifically adapted to: add the difference between interference in an ABS subframe sending mode and a non-ABS subframe sending mode that are used by the second base station to power of interference and noise actually obtained through estimation, and use the sum as adjusted total power of interference and noise; and Obtain, through calculation, the adjusted estimated SINR value according to the adjusted total power of interference and noise.

Further, the third parameter parsing module 62 specifically includes:

a third parameter parsing unit, adapted to determine, according to the ABS pattern parameters of the second base station, a first time segment in which the second base station transmits an ABS subframe in a downlink channel using the ABS pattern, and a subframe offset of a first ABS pattern period relative to a frame header;

a third channel aligning unit, adapted to determine, according to duration of a P-CCPCH of a current serving cell and a time offset of the downlink channel that uses the ABS pattern and is relative to a P-CCPCH, duration of the downlink channel using the ABS pattern; and a third time aligning unit, adapted to obtain the first transmission time segment according to the duration of the downlink channel using the ABS pattern, the subframe offset, and the first time segment.

Further, the third parameter parsing unit is specifically adapted to determine, according to the ABS pattern parameters of the second base station, the first time segment in each ABS pattern period and a subframe offset of a first ABS pattern period relative to a frame header;

the third time aligning unit is specifically adapted to obtain a first transmission time segment in each ABS pattern period according to the duration of the downlink channel using the ABS pattern, the subframe offset, and the first time segment in each ABS pattern period; and the estimated value adjusting module 63 is specifically adapted to adjust the actual estimated SINR value in the first transmission time segment in each ABS pattern period to obtain the adjusted estimated SINR value.

For a specific implementation of this embodiment, refer to the method for power control according to the second embodiment of the present invention.

In this embodiment of the present invention, in a first transmission time segment in which a second base station transmits an ABS subframe, an adjusted estimated SINR value less than an actual estimated SINR value is used to perform inner loop power control for a first base station. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel. Further, the estimated SINR value can also be adjusted according to a power difference between interference in an ABS subframe transmission mode and a non-ABS subframe transmission mode that are used by the second base station, thereby further optimizing the effect of compensation.

Figure 7:
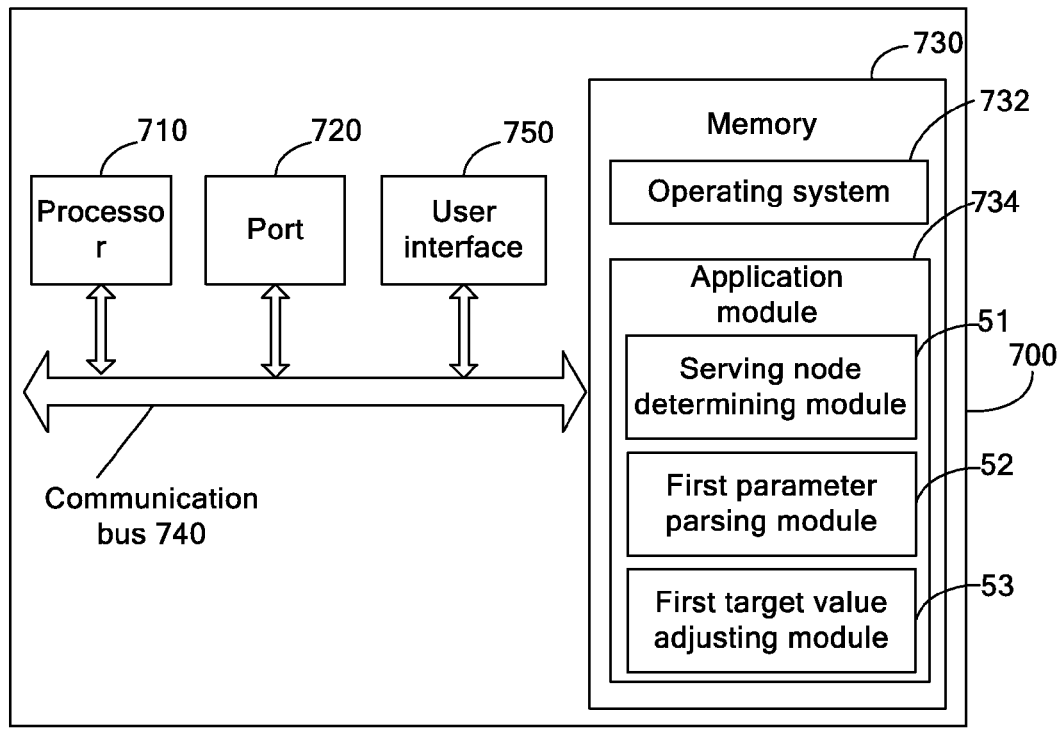
FIG. 7 is a schematic structural diagram of a UE according to a fifth embodiment of the present invention.

FIG. 7 is a schematic structural diagram of a UE 700 according to a fifth embodiment of the present invention. As shown in FIG. 7, the UE 700 generally includes at least one processor 710, for example, a central processing unit (CPU), a digital signal processor (DSP), at least one port 720, a memory 730, and at least one communication bus 740. The communication bus 740 is adapted to implement connection and communication between these components. The processor 710 is adapted to execute an executable module stored in the memory 730, for example, a computer program. Optionally, the UE 700 may include a user interface 750, where the user interface 750 includes but is not limited to a display, a keyboard, and a clicking device, for example, a mouse, a trackball, a touch pad, or a touch screen. The memory 730 may include a random access memory (RAM), and may also further include a non-volatile memory, for example, at least one disk storage.

In some implementations, the memory 730 stores the following elements: an executable module or a data structure, or subsets thereof, or extension sets thereof:

an operating system 732, including various system programs and adapted to implement various basic services and process a hardware-based task; and an application module 734, including various applications and adapted to implement various application services.

The application module 734 includes but is not limited to a serving node determining module 51, a first parameter parsing module 52, and a first target value adjusting module 53. Further, the application module 734 may include a second parameter parsing module and a second target value adjusting module. For a specific implementation of each module in the application module 734, refer to the corresponding module in the apparatus 500 for power control, which is not further described herein.

For a specific implementation of this embodiment, refer to the method for power control according to the first embodiment of the present invention. In this embodiment of the present invention, a target SINR value is adjusted to a larger value at first switching time at which a second base station switches from transmission of a non-ABS subframe to transmission of an ABS subframe, and the adjusted target SINR value is used as an initial target SINR value for performing inner loop power control for a first base station in a transmission time segment of the ABS subframe. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel. Further, the target SINR value can also be adjusted according to a power difference between interference in an ABS subframe transmission mode and a non-ABS subframe transmission mode that are used by the second base station, thereby further optimizing the effect of compensation.

FIG. 8 is a schematic structural diagram of a UE 800 according to a sixth embodiment of the present invention. As shown in FIG. 8, the UE 800 generally includes at least one processor 810, for example, a CPU and a DSP, at least one port 820, a memory 830, and at least one communication bus 840. The communication bus 840 is adapted to implement connection and communication between these components. The processor 810 is adapted to execute an executable module stored in the memory 830, for example, a computer program. Optionally, the UE 800 may include a user interface 850, where the user interface 850 includes but is not limited to a display, a keyboard, and a clicking device, for example, a mouse, a trackball, a touch pad, or a touch screen. The memory 830 may include a RAM, and may also further include a non-volatile memory, for example, at least one disk storage.

In some implementations, the memory 830 stores the following elements: an executable module or a data structure, or subsets thereof, or extension sets thereof:

an operating system 832, including various system programs and adapted to implement various basic services and process a hardware-based task; and an application module 834, including various applications and adapted to implement various application services.

The application module 834 includes but is not limited to a serving node determining module 61, a third parameter parsing module 62, and an estimated value adjusting module 63. For a specific implementation of each module in the application module 834, refer to the corresponding module in the apparatus 600 for power control, which is not further described herein.

In this embodiment of the present invention, in a first transmission time segment in which a second base station transmits an ABS subframe, an adjusted estimated SINR value less than an actual estimated SINR value is used to perform inner loop power control for a first base station. This solves a problem that a channel change cannot be tracked timely due to a great change of neighboring cell interference before and after switching of an ABS subframe and a non-ABS subframe during UE R99 channel power control, and mitigates, to some extent, an impact on a service carried by an R99 channel. Further, the estimated SINR value can also be adjusted according to a power difference between interference in an ABS subframe transmission mode and a non-ABS subframe transmission mode that are used by the second base station, thereby further optimizing the effect of compensation.

FIG. 9 is a schematic flowchart of a method for parameter configuration according to a seventh embodiment of the present invention. As shown in FIG. 9, the method includes:

901. Determine a power offset parameter, where the power offset parameter is a ratio of a reference value of a difference value between transmit power of an ABS subframe and a non-ABS subframe that are transmitted by a second base station to transmit power of a CPICH, or is a reference value of a ratio of transmit power of an HS-PDSCH of a second base station to transmit power of a CPICH.

For example, a network-side device, for example, an RNC or the second base station or a micro base station within the coverage of the second base station, determines the power offset parameter. Usually, the second base station is a macro base station.

902. Configure the power offset parameter for a UE within coverage of the second base station or for a UE that uses a first base station as a current serving node, where the second base station has co-channel interference in the first base station.

Specifically, the network-side device may configure a power offset parameter for the UE through higher-layer signaling or RRC signaling. That the second base station has co-channel interference in the first base station may be that when a cell of the second base station and a cell of the first base station are neighboring cells, a transmit signal of the second base station causes interference to a transmit signal on a same frequency resource and of the first base station. This may cause an impact on performance of a UE when the UE receives and demodulates a signal sent by the first base station. Another typical case is that: when the second base station is a macro base station and the first base station is a micro base station deployed within coverage of a cell of the second base station, a signal sent by the macro base station in the cell causes interference to a signal on a same frequency resource and sent by the micro base station. This may cause an impact on performance of a UE when the UE receives and demodulates the signal of the micro base station.

Usually, after step 902, the UE may estimate an interference change of the second base station according to the power offset parameter when the current serving node is the first base station. Specifically, a change of a serving cell of the UE is maintained by a mobility management mechanism on a network side, and the UE can determine the current serving node. The first base station may be a macro base station or a micro base station (namely, an LPN). Further, changes of aa subframe with strong interference and a subframe with weak interference of the second base station cause interference to the UE whose current serving node is the first base station. A typical scenario is: the first base station is a micro base station, the second base station is a macro base station, and the first base station is within the coverage of the second base station. Another typical scenario is: the first base station and the second base station are base stations of two neighboring cells.

In this embodiment, a power offset parameter of a second base station is configured for a UE within coverage of the second base station, so that when a current serving node is another base station, the UE can estimate, according to the power offset parameter, a power difference between interference in an ABS subframe transmission mode and a non-ABS subframe transmission mode that are used by the second base station, and the UE performs, based on the obtained difference between interference through estimation, necessary adjustment and optimization operations by considering, during communication with the second base station, an impact caused by an interference change that is expected to occur, thereby optimizing communication performance. In a typical application scenario, the communication process of an R99 channel of the first base station in the first embodiment and the second embodiment is optimized, which compensates for a problem that a channel change cannot be tracked timely due to a great change of neighboring cell interference before and after switching of an ABS subframe and a non-ABS subframe during UE R99 channel power control, and mitigates, to some extent, an impact on a service carried by the R99 channel. In addition to the R99 channel, the UE can also mitigate, based on the power offset parameter configured by the network side, an adverse impact on a service carried by another channel of the UE, where the adverse impact is caused by regular great interference fluctuation due to switching of an ABS subframe and a non-ABS subframe.

Figure 10:
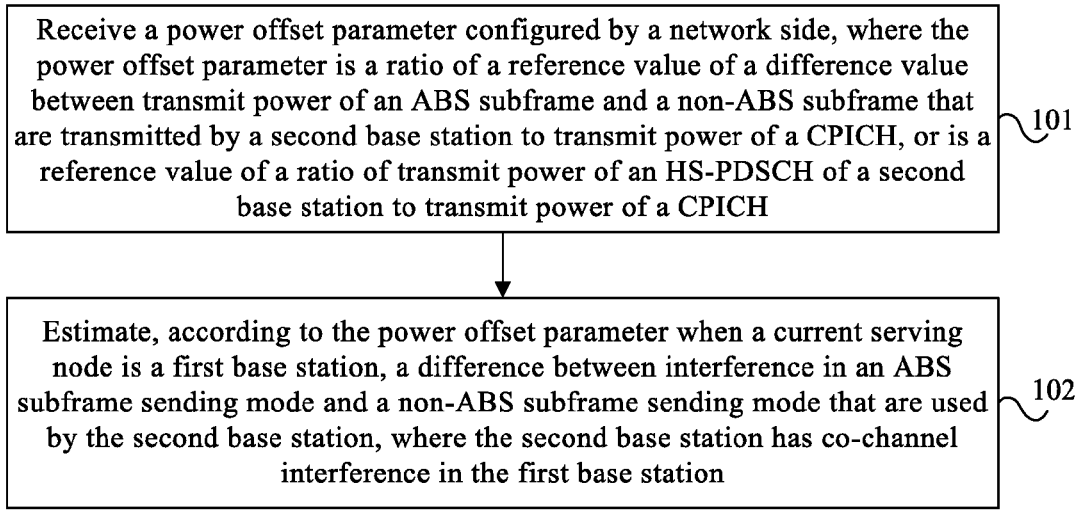
FIG. 10 is a schematic flowchart of a method for parameter configuration according to an eighth embodiment of the present invention.

FIG. 10 is a schematic flowchart of a method for parameter configuration according to an eighth embodiment of the present invention. As shown in FIG. 10, the method includes:

101. Receive a power offset parameter configured by a network side, where the power offset parameter is a ratio of a reference value of a difference value between transmit power of an ABS subframe and a non-ABS subframe that are transmitted by a second base station to transmit power of a CPICH, or is a reference value of a ratio of transmit power of an HS-PDSCH of a second base station to transmit power of a CPICH.

For example, a UE receives a power offset parameter configured by a network side. Usually, the second base station is a macro base station.

102. Estimate, according to the power offset parameter when a current serving node is a first base station, a power difference between interference in an ABS subframe transmission mode and a non-ABS subframe transmission mode that are used by the second base station, where the second base station has co-channel interference in the first base station.

Specifically, a change of a serving cell of the UE is maintained by a mobility management mechanism on the network side, and the UE can determine the current serving node. The first base station may be a macro base station or a micro base station (namely, an LPN). That the second base station has co-channel interference in the first base station may be that when a cell of the second base station and a cell of the first base station are neighboring cells, a transmit signal of the second base station causes interference to a transmit signal on a same frequency resource and of the first base station. This may cause an impact on performance of a UE when the UE receives and demodulates a signal sent by the first base station. Another typical case is that: when the second base station is a macro base station and the first base station is a micro base station deployed within coverage of a cell of the second base station, a signal sent by the macro base station in the cell causes interference to a signal on a same frequency resource and sent by the micro base station. This may cause an impact on performance of a UE when the UE receives and demodulates the signal of the micro base station.

In this embodiment, changes of a subframe with strong interference and a subframe with weak interference of the second base station cause interference to the UE whose current serving node is the first base station. A typical scenario is: the first base station is a micro base station, the second base station is a macro base station, and the first base station is within coverage of the second base station. Another typical scenario is: the first base station and the second base station are base stations of two neighboring cells.

Further, the estimating, according to the power offset parameter, a power difference between interference in an ABS subframe transmission mode and a non-ABS subframe transmission mode that are used by the second base station includes:

estimating interference power of a CPICH of the second base station; and estimating, according to the power offset parameter and the interference power of the CPICH of the second base station, the difference between interference in an ABS subframe sending mode and a non-ABS subframe sending mode that are used by the second base station.

Specifically, the difference between interference in an ABS subframe sending mode and a non-ABS subframe sending mode that are used by the second base station may be a product of the interference power of the CPICH of the second base station and the power offset parameter or adjustment of the product.

Specifically, the difference between interference in an ABS subframe sending mode and a non-ABS subframe sending mode that are used by the second base station may be $I_{NB2,CPICH,t1}*PO$ in formula (1) and $I_{NB2,CPICH,t2}*PO$ in formula (6) in the first embodiment, or $I_{NB2,CPICH,cur}*PO$ in formula (9) in the second embodiment.

In this embodiment, a UE receives a power offset parameter of a second base station, where the power offset parameter is configured by a network side, and estimates, according to the power offset parameter when a current serving node is a first base station, a power difference between interference in an ABS subframe transmission mode and a non-ABS subframe transmission mode that are used by the second base station, so that the UE performs, based on the estimated difference between interference, necessary adjustment and optimization operations by considering, during communication with the second base station, an impact caused by an interference change that is expected to occur, thereby optimizing communication performance. In a typical application scenario, a UE optimizes the communication process of an R99 channel of a first base station in the first embodiment and the second embodiment, which compensates for a problem that a channel change cannot be tracked timely due to a great change of neighboring cell interference before and after switching of an ABS subframe and a non-ABS subframe during UE R99 channel power control, and mitigates, to some extent, an impact on a service carried by the R99 channel. In addition to the R99 channel, the UE can also mitigate, based on the obtained difference between interference through estimation, an adverse impact on a service carried by another channel of the UE, where the adverse impact is caused by regular great interference fluctuation due to switching of an ABS subframe and a non-ABS subframe.

Figure 11:
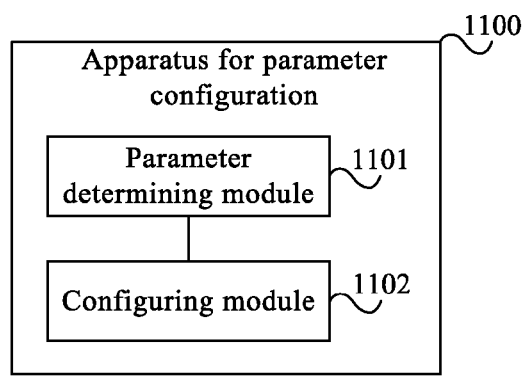
FIG. 11 is a schematic structural diagram of an apparatus for parameter configuration according to a ninth embodiment of the present invention.

FIG. 11 is a schematic structural diagram of an apparatus 1100 for parameter configuration according to a ninth embodiment of the present invention. As shown in FIG. 11, the apparatus includes:

a parameter determining module 1101, adapted to determine a power offset parameter, where the power offset parameter is a ratio of a reference value of a difference value between transmit power of an ABS subframe and a non-ABS subframe that are transmitted by a second base station to transmit power of a CPICH, or is a reference value of a ratio of transmit power of an HS-PDSCH of a second base station to transmit power of a CPICH; and a configuring module 1102, adapted to configure the power offset parameter for a UE within coverage of the second base station or for a UE that uses a first base station as a current serving node, where the second base station has co-channel interference in the first base station.

Further, the first base station is a micro base station, the second base station is a macro base station, and the first base station is within coverage of the second base station; or the first base station and the second base station are base stations of two neighboring cells.

For the specific implementation of this embodiment, reference may be made to the method for parameter configuration according to the seventh embodiment of the present invention.

Figure 12:
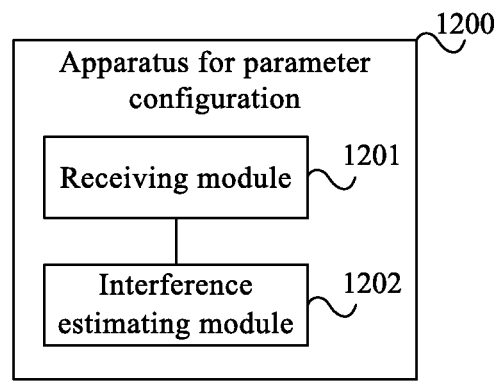
FIG. 12 is a schematic structural diagram of an apparatus for parameter configuration according to a tenth embodiment of the present invention.

FIG. 12 is a schematic structural diagram of an apparatus 1200 for parameter configuration according to a tenth embodiment of the present invention. As shown in FIG. 12, the apparatus includes:

a receiving module 1201, adapted to receive a power offset parameter configured by a network side, where the power offset parameter is a ratio of a reference value of a difference value between transmit power of an ABS subframe and a non-ABS subframe that are transmitted by a second base station to transmit power of a CPICH, or is a reference value of a ratio of transmit power of an HS-PDSCH of a second base station to transmit power of a CPICH; and an interference estimating module 1202, adapted to estimate, according to the power offset parameter when a current serving node is a first base station, a power difference between interference in an ABS subframe transmission mode and a non-ABS subframe transmission mode that are used by the second base station, where the second base station has co-channel interference in the first base station.

Further, the interference estimating module 1202 is specifically adapted to:

estimate interference power of a CPICH of the second base station; and estimate, according to the power offset parameter and the interference power of the CPICH of the second base station, the difference between interference in an ABS subframe sending mode and a non-ABS subframe sending mode that are used by the second base station.

Further, the first base station is a micro base station, the second base station is a macro base station, and the first base station is within coverage of the second base station; or the first base station and the second base station are base stations of two neighboring cells.

For a specific implementation of this embodiment, refer to the method for parameter configuration according to the eighth embodiment of the present invention.

Figure 13:
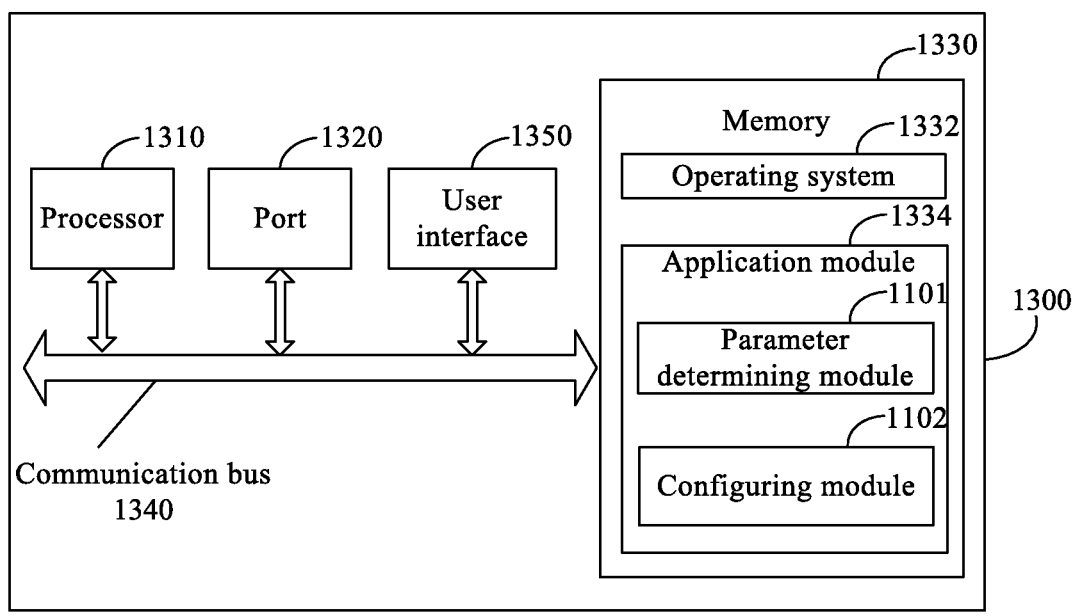
FIG. 13 is a schematic structural diagram of a UE according to an eleventh embodiment of the present invention.

FIG. 13 is a schematic structural diagram of a UE 1300 according to an eleventh embodiment of the present invention. As shown in FIG. 13, the UE 1300 generally includes at least one processor 1310, for example, a CPU and a DSP, at least one port 1320, a memory 1330, and at least one communication bus 1340. The communication bus 1340 is adapted to implement connection and communication between these components. The processor 1310 is adapted to execute an executable module stored in the memory 1330, for example, a computer program. Optionally, the UE 1300 may include a user interface 1350, where the user interface 1350 includes but is not limited to a display, a keyboard, and a clicking device, for example, a mouse, a trackball, a touch pad, or a touch screen. The memory 1330 may include a RAM, and may also further include a non-volatile memory, for example, at least one disk storage.

In some implementations, the memory 1330 stores the following elements: an executable module or a data structure, or subsets thereof, or extension sets thereof:

an operating system 1332, including various system programs and adapted to implement various basic services and process a hardware-based task; and an application module 1334, including various applications and adapted to implement various application services.

The application module 1334 includes but is not limited to a parameter determining module 1101 and a configuring module 1102. For a specific implementation of each module in the application module 1334, refer to the corresponding module in the apparatus 1100 for parameter configuration, which is not further described herein.

Figure 14:
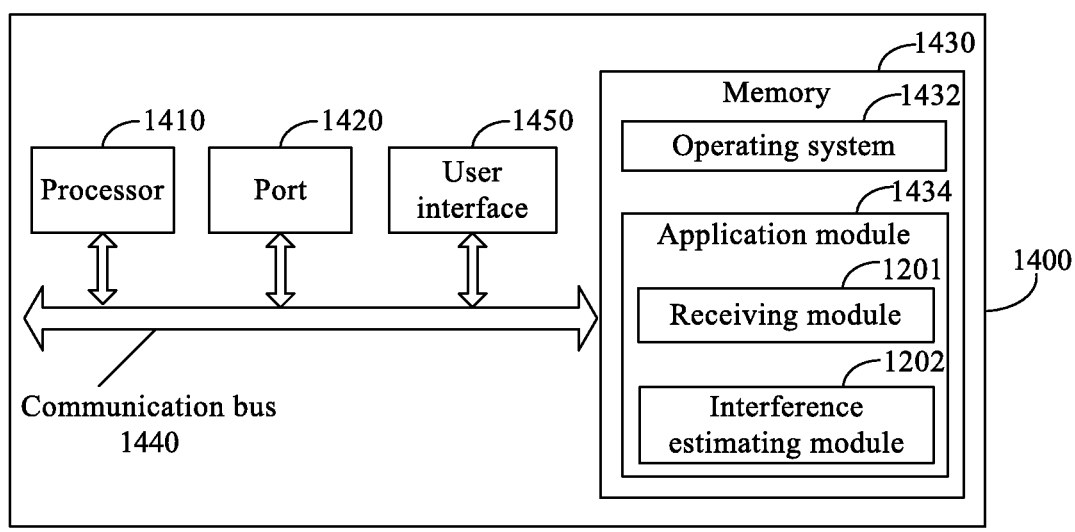
FIG. 14 is a schematic structural diagram of a network-side device according to a twelfth embodiment of the present invention.

FIG. 14 is a schematic structural diagram of a network-side device 1400 according to a twelfth embodiment of the present invention. As shown in FIG. 14, the device 1400 generally includes at least one processor 1410, for example, a CPU and a DSP, at least one port 1420, a memory 1430, and at least one communication bus 1440. The communication bus 1440 is adapted to implement connection and communication between these components. The processor 1410 is adapted to execute an executable module stored in the memory 1430, for example, a computer program. Optionally, the device 1400 may include a user interface 1450, where the user interface 1450 includes but is not limited to a display, a keyboard, and a clicking device, for example, a mouse, a trackball, a touch pad, or a touch screen. The memory 1430 may include a RAM, and may also further include a non-volatile memory, for example, at least one disk storage.

In some implementations, the memory 1430 stores the following elements: an executable module or a data structure, or subsets thereof, or extension sets thereof:

an operating system 1432, including various system programs and adapted to implement various basic services and process a hardware-based task; and an application module 1434, including various applications and adapted to implement various application services.

The application module 1434 includes but is not limited to a receiving module 1201 and an interference estimating module 1202. For a specific implementation of each module in the application module 1434, refer to the corresponding module in the apparatus 1200 for parameter configuration, which is not further described herein.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various media capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make updates to the technical solutions described in the foregoing embodiments, or make equivalent replacements to some or all the technical features thereof, without departing from the scope of the technical solutions of the embodiments of the present invention.

What is claimed is:

1. A method for power control, the method comprising:
    determining that a current serving node is a first base station;
    determining, according to almost blank subframe (ABS) pattern parameters of a second base station, a first time point at which the second base station switches from transmission of a non-ABS subframe to transmission of an ABS subframe in a downlink channel using an ABS pattern, wherein the second base station has co-channel interference in the first base station;
    obtaining a first switching time according to a time offset of the downlink channel that uses the ABS pattern and is relative to a Primary Common Control Physical Channel (P-CCPCH), a subframe offset, and the first time point; and
    at the first switching time, adjusting a target signal to interference plus noise ratio (SINR) value before current switching to obtain a target SINR value of the first switching time, so that the target SINR value of the first switching time is used as an initial target SINR value for performing inner loop power control for the first base station in a transmission time segment of the ABS subframe, wherein the target SINR value of the first switching time is greater than the target SINR value before current switching.

2. The method according to claim 1, further comprising:
determining, according to the ABS pattern parameters of the second base station, a second switching time at which the second base station switches from transmission of an ABS subframe to transmission of a non-ABS subframe; and
at the second switching time, adjusting a target SINR value before current switching to obtain a target SINR value of the second switching time, so that the target SINR value of the second switching time is used as an initial target SINR value for performing inner loop power control for the first base station in a transmission time segment of the non-ABS subframe, wherein the target SINR value of the second switching time is less than the target SINR value before current switching.

3. The method according to claim 1, wherein adjusting, at the first switching time, the target SINR value before current switching to obtain a target SINR value of the first switching time comprises:
adjusting, at the first switching time according to a first adjustment factor, the target SINR value before current switching to obtain the target SINR value of the first switching time, wherein the first adjustment factor is obtained according to a power difference between interference in an ABS subframe transmission mode and a non-ABS subframe transmission mode that are used by the second base station.

4. The method according to claim 2, wherein the adjusting, at second switching time, the target SINR value before current switching to obtain a target SINR value of the second switching time comprises:
adjusting, at the second switching time according to a second adjustment factor, the target SINR value before current switching to obtain the target SINR value of the second switching time, wherein the second adjustment factor is obtained according to a power difference between interference in an ABS subframe transmission mode and a non-ABS subframe transmission mode that are used by the second base station.

5. The method according to claim 3, wherein adjusting, at the first switching time according to a first adjustment factor, the target SINR value before current switching to obtain the target SINR value of the first switching time comprises:
acquiring the target SINR value before current switching and an estimated value of total power of interference and noise before current switching;
estimating interference power of a Common Pilot Channel (CPICH) of the second base station at the first switching time;
obtaining, according to the estimated value of the total power of interference and noise before current switching, the interference power of the CPICH of the second base station at the first switching time, and a power offset parameter, the first adjustment factor by using the following formula:

$$L1 = \frac{Ioc_{pre-t1}}{Ioc_{pre-t1} - I_{NB2,CPICH,t1} * PO}$$

wherein, L1 represents the first adjustment factor, $Ioc_{pre-t1}$ represents the estimated value of the total power of interference and noise before current switching, $I_{NB2,CPICH,t1}$ represents the interference power of the CPICH of the second base station at the first switching time, PO represents the power offset parameter, $I_{NB2,CPICH,t1}*PO$ represents the difference between interference in an ABS subframe sending mode and a non-ABS subframe sending mode that are used by the second base station, and the power offset parameter is a ratio of a reference value of a difference value between transmit power of an ABS subframe and a non-ABS subframe that are transmitted by the second base station to transmit power of the CPICH; and
multiplying the target SINR value before current switching by the first adjustment factor to obtain the target SINR value of the first switching time.

6. The method according to claim 4, wherein adjusting, at the second switching time according to a second adjustment factor, the target SINR value before current switching to obtain the target SINR value of the second switching time comprises:
acquiring the target SINR value before current switching and an estimated value of total power of interference and noise before current switching;
estimating interference power of a Common Pilot Channel (CPICH) of the second base station at the second switching time;
obtaining, according to the total power of interference and noise before current switching, the interference power of the CPICH of the second base station at the second switching time, and a power offset parameter, the second adjustment factor by using the following formula:

$$L2 = \frac{Ioc_{pre-t2}}{Ioc_{pre-t2} + I_{NB2,CPICH,t2} * PO}$$

wherein, L2 represents the second adjustment factor, $Ioc_{pre-t2}$ represents the total power of interference and noise before current switching, $I_{NB2,CPICH,t2}$ represents the interference power of the CPICH of the second base station at the second switching time, PO represents the power offset parameter, and $I_{NB2,CPICH,t2}*PO$ represents the difference between interference in an ABS subframe sending mode and a non-ABS subframe sending mode that are used by the second base station; and
multiplying the target SINR value before current switching by the second adjustment factor to obtain the target SINR value of the second switching time.

7. The method according to claim 3, wherein adjusting, at the first switching time according to a first adjustment factor, the target SINR value before current switching to obtain the target SINR value of the first switching time comprises:
acquiring the target SINR value before current switching and the difference between interference in an ABS subframe sending mode and a non-ABS subframe sending mode that are used by the second base station, wherein the difference is configured by a network side;
determining the first adjustment factor according to the difference between interference in an ABS subframe sending mode and a non-ABS subframe sending mode that are used by the second base station; and
multiplying the target SINR value before current switching by the first adjustment factor to obtain the target SINR value of the first switching time.

8. The method according to claim 4, wherein adjusting, at the second switching time according to a second adjustment factor, the target SINR value before current switching to obtain the target SINR value of the second switching time comprises:
   acquiring the target SINR value before current switching and the difference between interference in an ABS subframe sending mode and a non-ABS subframe sending mode that are used by the second base station, wherein the difference is configured by a network side;
   determining the second adjustment factor according to the difference between interference in an ABS subframe sending mode and a non-ABS subframe sending mode that are used by the second base station; and
   multiplying the target SINR value before current switching by the second adjustment factor to obtain the target SINR value of the second switching time.

9. The method according to claim 1, wherein the method further comprises:
   determining, according to the ABS pattern parameters of the second base station, the subframe offset of a first ABS pattern period relative to a frame header; and
   determining, according to the time offset of the downlink channel and duration of the P-CCPCH of a current serving cell, the duration of the downlink channel using the ABS pattern.

10. The method according to claim 2, wherein determining the second switching time comprises:
    determining, according to the ABS pattern parameters of the second base station, a second time point at which the second base station switches from transmission of an ABS subframe to transmission of a non-ABS subframe in the downlink channel using the ABS pattern, and a subframe offset of a first ABS pattern period relative to a frame header;
    determining, according to the time offset of the downlink channel and duration of a P-CCPCH of a current serving cell, duration of the downlink channel using the ABS pattern; and
    obtaining the second switching time according to the duration of the downlink channel using the ABS pattern, the subframe offset, and the second time point.

11. An apparatus for power control, comprising:
    a processor; and
    a memory storing a program to be executed by the processor, the program comprising instructions to:
      determine that a current serving node is a first base station,
      determine, according to almost blank subframe (ABS) pattern parameters of a second base station, a first time point at which the second base station switches from transmission of a non-ABS subframe to transmission of an ABS subframe in a downlink channel using an ABS pattern, wherein the second base station has co-channel interference in the first base station,
      obtain a first switching time according to a time offset of the downlink channel that uses the ABS pattern and is relative to a Primary Common Control Physical Channel (P-CCPCH), a subframe offset, and the first time point, and
      adjust, at the first switching time, a target signal to interference plus noise ratio (SINR) value before current switching to obtain a target SINR value of the first switching time, so that the target SINR value of the first switching time is used as an initial target SINR value for performing inner loop power control for the first base station in a transmission time segment of the ABS subframe, wherein the target SINR value of the first switching time is greater than the target SINR value before current switching.

12. The apparatus according to claim 11, wherein the program further comprises instructions to:
    determine, according to the ABS pattern parameters of the second base station, second switching time at which the second base station switches from transmission of an ABS subframe to transmission of a non-ABS subframe; and
    adjust, at the second switching time, a target SINR value before current switching to obtain a target SINR value of the second switching time, so that the target SINR value of the second switching time is used as an initial target SINR value for performing inner loop power control for the first base station in a transmission time segment of the non-ABS subframe, wherein the target SINR value of the second switching time is less than the target SINR value before current switching.

13. The apparatus according to claim 11, wherein the program further comprises instructions to adjust, at the first switching time according to a first adjustment factor, the target SINR value before current switching to obtain the target SINR value of the first switching time, wherein the first adjustment factor is obtained according to a power difference between interference in an ABS subframe transmission mode and a non-ABS subframe transmission mode that are used by the second base station.

14. The apparatus according to claim 12, wherein the program further comprises instructions to adjust, at the second switching time according to a second adjustment factor, the target SINR value before current switching to obtain the target SINR value of the second switching time, wherein the second adjustment factor is obtained according to a power difference between interference in an ABS subframe transmission mode and a non-ABS subframe transmission mode that are used by the second base station.

15. The apparatus according to claim 11, wherein the program further comprises instructions to:
    determine, according to the ABS pattern parameters of the second base station, the subframe offset of a first ABS pattern period relative to a frame header; and
    determine, according to the time offset of the downlink channel and duration of a P-CCPCH of a current serving cell, the duration of the downlink channel using the ABS pattern.

16. The apparatus according to claim 12, wherein the program further comprises instructions to:
    determine, according to the ABS pattern parameters of the second base station, a second time point at which the second base station switches from transmission of an ABS subframe to transmission of a non-ABS subframe in the downlink channel using the ABS pattern, and a subframe offset of a first ABS pattern period relative to a frame header;
    determine, according to the time offset of the downlink channel and duration of a P-CCPCH of a current serving cell, duration of the downlink channel using the ABS pattern; and
    obtain the second switching time according to the duration of the downlink channel using the ABS pattern, the subframe offset, and the second time point.

* * * * *